United States Patent
Puhan et al.

(10) Patent No.: US 11,537,406 B2
(45) Date of Patent: Dec. 27, 2022

(54) AUTOMATIC FORMATION OF A VIRTUAL CHASSIS USING ZERO TOUCH PROVISIONING

(71) Applicant: Juniper Networks, Inc., Sunnyvale, CA (US)

(72) Inventors: Alfa Prakash Puhan, Bangalore (IN); Nandan Debnath, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 106 days.

(21) Appl. No.: 16/793,905

(22) Filed: Feb. 18, 2020

(65) Prior Publication Data
US 2021/0255876 A1 Aug. 19, 2021

(51) Int. Cl.
*H04L 67/1061* (2022.01)
*G06F 9/4401* (2018.01)
*G06F 16/182* (2019.01)

(52) U.S. Cl.
CPC ........ *G06F 9/4416* (2013.01); *G06F 16/1834* (2019.01); *H04L 67/1061* (2013.01)

(58) Field of Classification Search
None
See application file for complete search history.

(56) References Cited

U.S. PATENT DOCUMENTS

| | | | | |
|---|---|---|---|---|
| 8,139,492 B1* | 3/2012 | Peterson | .................. | H04L 45/00 709/241 |
| 8,953,623 B1* | 2/2015 | Eyada | .................... | H04L 47/125 370/401 |
| 9,304,800 B1* | 4/2016 | Scholl | .................. | G06F 9/45537 |
| 10,003,495 B1* | 6/2018 | Sharma | ............... | H04L 41/0806 |
| 10,148,506 B1* | 12/2018 | Anburose | ........... | H04L 41/5006 |
| 2006/0187854 A1* | 8/2006 | Booth, III | ........... | H04L 12/4691 370/254 |
| 2007/0005950 A1* | 1/2007 | Backman | .............. | G06F 9/4416 713/2 |

(Continued)

OTHER PUBLICATIONS

Anonymous., "Automation Win: Zero-Touch Provisioning," ipSpace. net blog, May 3, 2018. pp. 1-5, XP055801291. [retrieved on May 4, 2021] Retrieved from the Internet: [URL:https://blog.ipspace.net/2018/05/automation-win-zero-touch-provisioning.html].

(Continued)

*Primary Examiner* — Dhairya A Patel
(74) *Attorney, Agent, or Firm* — Harrity & Harrity, LLP

(57) ABSTRACT

A network device may obtain information concerning a virtual chassis that indicates that the network device and an additional network device are to be included in the virtual chassis. The network device may determine, based on the information concerning the virtual chassis, that the network device is connected to the additional network device, wherein the network device is connected to the additional network device via a link between a network interface of the network device and a network interface of the additional network device. The network device may cause the network interface of the network device to be converted to a virtual chassis interface and the network interface of the additional network device to be converted to a virtual chassis interface to enable the network device and the additional network device to be included in the virtual chassis to allow bootstrapping of the virtual chassis as a single logical device.

19 Claims, 19 Drawing Sheets

(56) References Cited

U.S. PATENT DOCUMENTS

| | | | |
|---|---|---|---|
| 2012/0192189 A1* | 7/2012 | Diament | G06Q 10/067 718/102 |
| 2013/0064102 A1* | 3/2013 | Chang | H04L 49/552 370/255 |
| 2013/0077621 A1* | 3/2013 | Jacob Da Silva | H04L 49/70 370/355 |
| 2013/0088971 A1* | 4/2013 | Anantharam | H04L 49/10 370/255 |
| 2014/0286345 A1* | 9/2014 | Mohandas | H04L 49/25 370/401 |
| 2014/0369230 A1* | 12/2014 | Nallur | H04L 45/02 370/254 |
| 2017/0223479 A1* | 8/2017 | Ly | H04L 67/125 |
| 2019/0245704 A1* | 8/2019 | Pala | H04L 9/3242 |
| 2020/0044917 A1* | 2/2020 | Peng | H04L 41/0803 |
| 2020/0128392 A1* | 4/2020 | Li | H04W 8/205 |
| 2020/0213191 A1* | 7/2020 | Watsen | H04L 61/5014 |
| 2021/0274024 A1* | 9/2021 | Jiménez | H04L 67/52 |
| 2021/0279072 A1* | 9/2021 | Lee | H04L 67/1095 |
| 2022/0232045 A1* | 7/2022 | Phan | H04L 9/3268 |
| 2022/0238985 A1* | 7/2022 | Teresi | H01Q 1/246 |

OTHER PUBLICATIONS

Anonymous., "Communication Protocol—Wikipedia," Feb. 17, 2020, pp. 1-17, XP055801289. [retrieved on May 4, 2021] Retrieved from the Internet: [URL:https://en.wikipedia.org/w/index.php?title=Communication_protocol&oldid=941232660].

Anonymous., "Neighbor Discovery Protocol—Wikipedia," Dec. 29, 2019, pp. 1-3, XP055801290. [retrieved on May 4, 2021] Retrieved from the Internet: [URL:https://en.wikipedia.org/w/index.php?title=Neighbor_Discovery_Protocol&oldid=933035174].

Extended European Search Report for Application No. EP20166059.4, dated May 17, 2021, 15 pages.

Anonymous., "Auto-provisioned", Feb. 28, 2017, 1 page, XP055729611, [Retrieved on Sep. 10, 2020] Retrieved from the internet [URL: https://www.juniper.net/documentation/en_US/junos/topics/reference/configuration-statement/auto-provisioned-virtual-chassis.html].

Demchenko Y., et al., "Enabling Automated Network Services Provisioning for Cloud Based Applications Using Zero Touch Provisioning", IEEE/ACM 8th International Conference on Utility and Cloud Computing (UCC), Dec. 7, 2015, pp. 458-464, XP032881538.

Juniper Networks., "Autoprovisioning a Virtual Chassis Fabric—Technical Documentation—Support—Juniper Networks", Sep. 29, 2017, 3 pages, XP055729618, [Retrieved on Sep. 10, 2020] Retrieved from the internet [URL: https://web.archive.org/web/20170929175016/https://www.juniper.net/documentation/en_US/junos/topics/task/configuration/vcf-autoprovisioning.html].

Keinke J-W., et al., "What is Zero Touch Provisioning and Is It Useful For Me?", Jan. 14, 2019, 7 pages, XP055729865, [Retrieved on Sep. 11, 2020] Retrieved from the Internet [URL: https://www.infradata.de/en/news-blog/what-is-zero-touch-provisioning/].

Partial European Search Report for Application No. EP20166059.4, dated Jan. 29, 2021, 13 pages.

* cited by examiner

Example Bootstrap Request Message

```
POST /restconf/operations/ietf-sztp-bootstrap-server:get-bootstrapping-data HTTP/1.1
HOST: example.com
Content-Type: application/yang.data+xml
<input xmlns="urn:ietf:params:xml:ns:yang:ietf-sztp-bootstrap-server">
    <os-name>example-os</os-name>
    <os-version>10.1K</os-version>
    <hw-model>example300</hw-model>
</input>
```

FIG. 3A

Example Primary Bootstrap Response Message

```
HTTP/1.1 200 OK
Date: Sat, 31 Oct 2019 17:02:40 GMT
Server: example-server
Content-Type: application/yang.data+xml
<output xmlns="urn:ietf:params:xml:ns:yang:ietf-sztp-bootstrap-server">
    <topology-discovery-info>
        <topology-identifier>abc</topology-identifier>
        <mode>virtual-chassis</mode>
        <configuration>
            <vbg_preferred/>
            <prevent_loop/>
            <node>
                <bpserial-id></bpserial-id>
                <role>MC/LC</role>
                <interfaces>ifi ifn</interfaces>
            </node>
            <node>
            ...
            </node>
        </configuration>
    </topology-discovery-info>

<owner-certificate>base64encodedvalue==</owner-certificate>
<ownership-voucher>base64encodedvalue==</ownership-voucher>
</output>
```

FIG. 3B

Example Secondary Bootstrap Response Message

```
HTTP/1.1 200 OK
Date: Sat, 31 Oct 2019 17:02:40 GMT
Server: example-server
Content-Type: application/yang.data+xml
<output xmlns="urn:ietf:params:xml:ns:yang:ietf-sztp-bootstrap-server">
    <topology-discovery-info>
        <topology-identifier>abc</topology-identifier>
        <mode>virtual-chassis</mode>
    </topology-discovery-info>

<owner-certificate>base64encodedvalue==</owner-certificate>
    <ownership-voucher>base64encodedvalue==</ownership-voucher>
</output>
```

FIG. 3C

Example Virtual Chassis Report

```
POST /restconf/operations/ietf-sztp-bootstrap-server:report-progress HTTP/1.1
HOST: example.com
Content-Type: application/yang.data+xml
<input xmlns="urn:ietf:params:xml:ns:yang:ietf-sztp-bootstrap-server">
    <progress-type>topology-discovery-complete</progress-type>
    <topology-identifier>abc</topology-identifier>
    <message>example message</message>
    <nodes>id1 id2 id3</nodes>
</input>
```

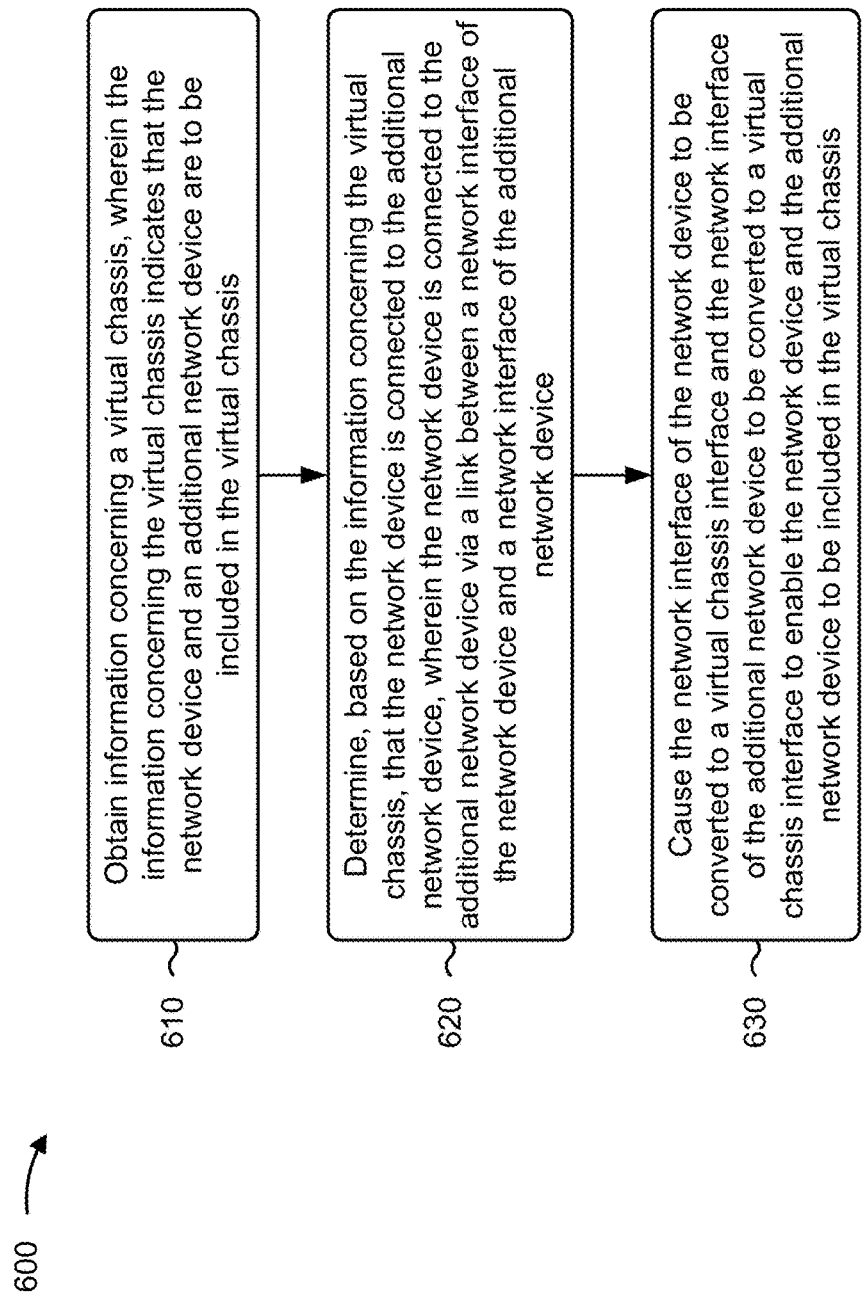

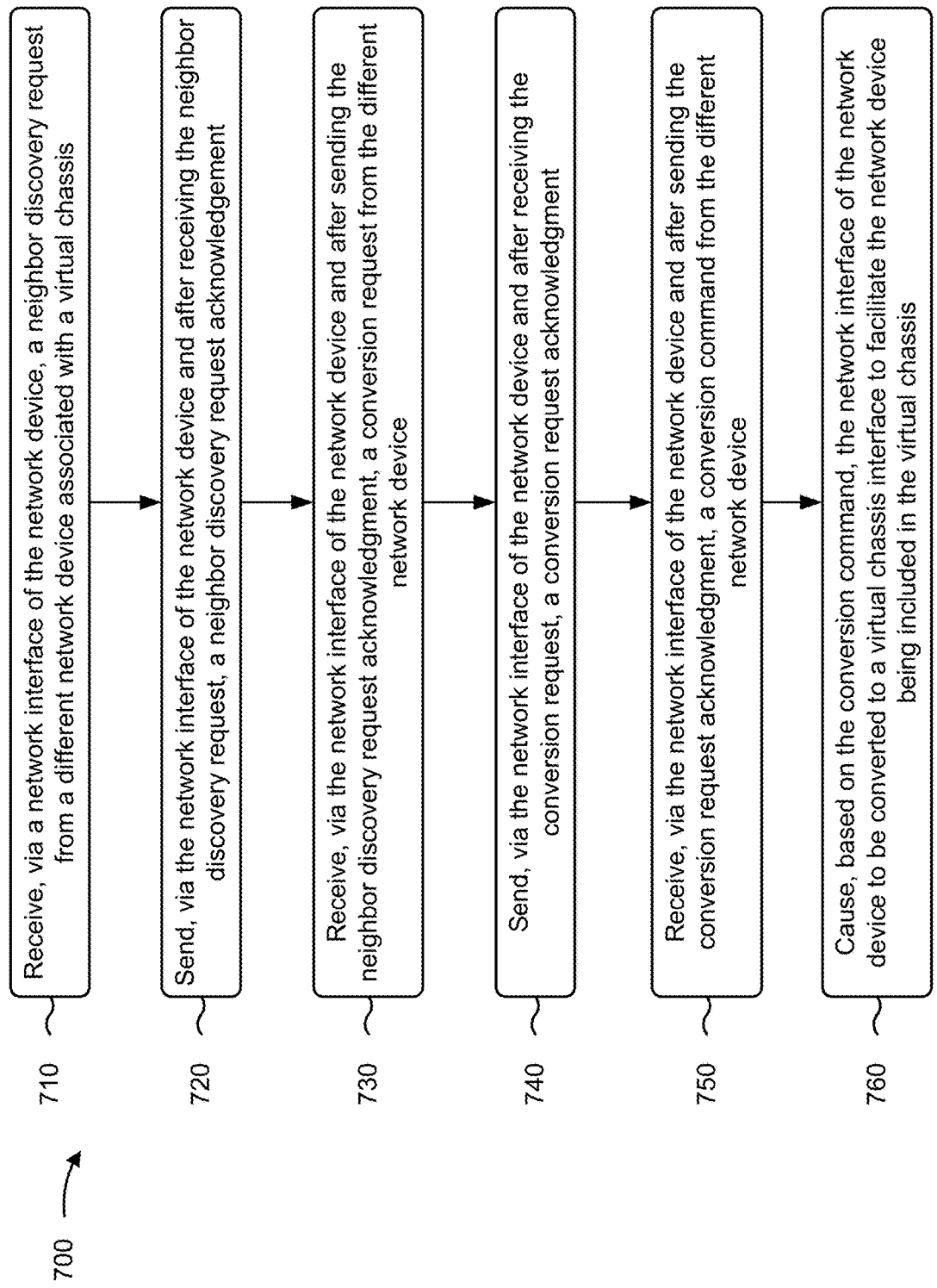

AUTOMATIC FORMATION OF A VIRTUAL CHASSIS USING ZERO TOUCH PROVISIONING

BACKGROUND

Zero Touch Provisioning (ZTP) is a technique to provision a network device when the network device is booting in a factory-default state. Provisioning may include updating the boot image, establishing an initial configuration, and executing arbitrary scripts to address auxiliary needs. Once provisioned, the network device is able to establish connections with other network devices.

A virtual chassis is a group of network devices that are connected together to form a single logical network device. The group of network devices may be connected via respective virtual chassis interfaces that are configured to transmit virtual chassis specific control traffic between network devices of the group of network devices.

SUMMARY

According to some implementations, a method may include obtaining, by a network device, information concerning a virtual chassis, wherein the information concerning the virtual chassis indicates that the network device and an additional network device are to be included in the virtual chassis; determining, by the network device and based on the information concerning the virtual chassis, that the network device is connected to the additional network device, wherein the network device is connected to the additional network device via a link between a network interface of the network device and a network interface of the additional network device; and causing the network interface of the network device to be converted to a virtual chassis interface and the network interface of the additional network device to be converted to a virtual chassis interface to enable the network device and the additional network device to be included in the virtual chassis.

According to some implementations, a network device may include one or more memories, and one or more processors configured to receive, via a network interface of the network device, a neighbor discovery request from a different network device associated with a virtual chassis; send, via the network interface of the network device and after receiving the neighbor discovery request, a neighbor discovery request acknowledgment; receive, via the network interface of the network device and after sending the neighbor discovery request acknowledgment, a conversion request from the different network device; send, via the network interface of the network device and after receiving the conversion request, a conversion request acknowledgment; receive, via the network interface of the network device and after sending the conversion request acknowledgment, a conversion command from the different network device; and cause, based on the conversion command, the network interface of the network device to be converted to a virtual chassis interface to facilitate the network device being included in the virtual chassis.

According to some implementations, a non-transitory computer-readable medium may store one or more instructions. The one or more instructions, when executed by one or more processors of a network device of a virtual chassis, may cause the one or more processors to generate a neighbor discovery request; cause a particular network device of the virtual chassis to send the neighbor discovery request to an additional network device that is not included in the virtual chassis; receive a neighbor discovery request acknowledgment from the additional network device; determine, based on the neighbor discovery request acknowledgment, that the additional network device is to be included in the virtual chassis; cause a network interface of the particular network device to be converted to a virtual chassis interface; and cause a network interface of the additional network device to be converted to a virtual chassis interface.

BRIEF DESCRIPTION OF THE DRAWINGS

FIGS. 3A-3D are diagrams depicting example messages described herein.

FIGS. 6-8 are flowcharts of example processes for automatic formation of a virtual chassis using zero touch provisioning.

DETAILED DESCRIPTION

Figure 1A:
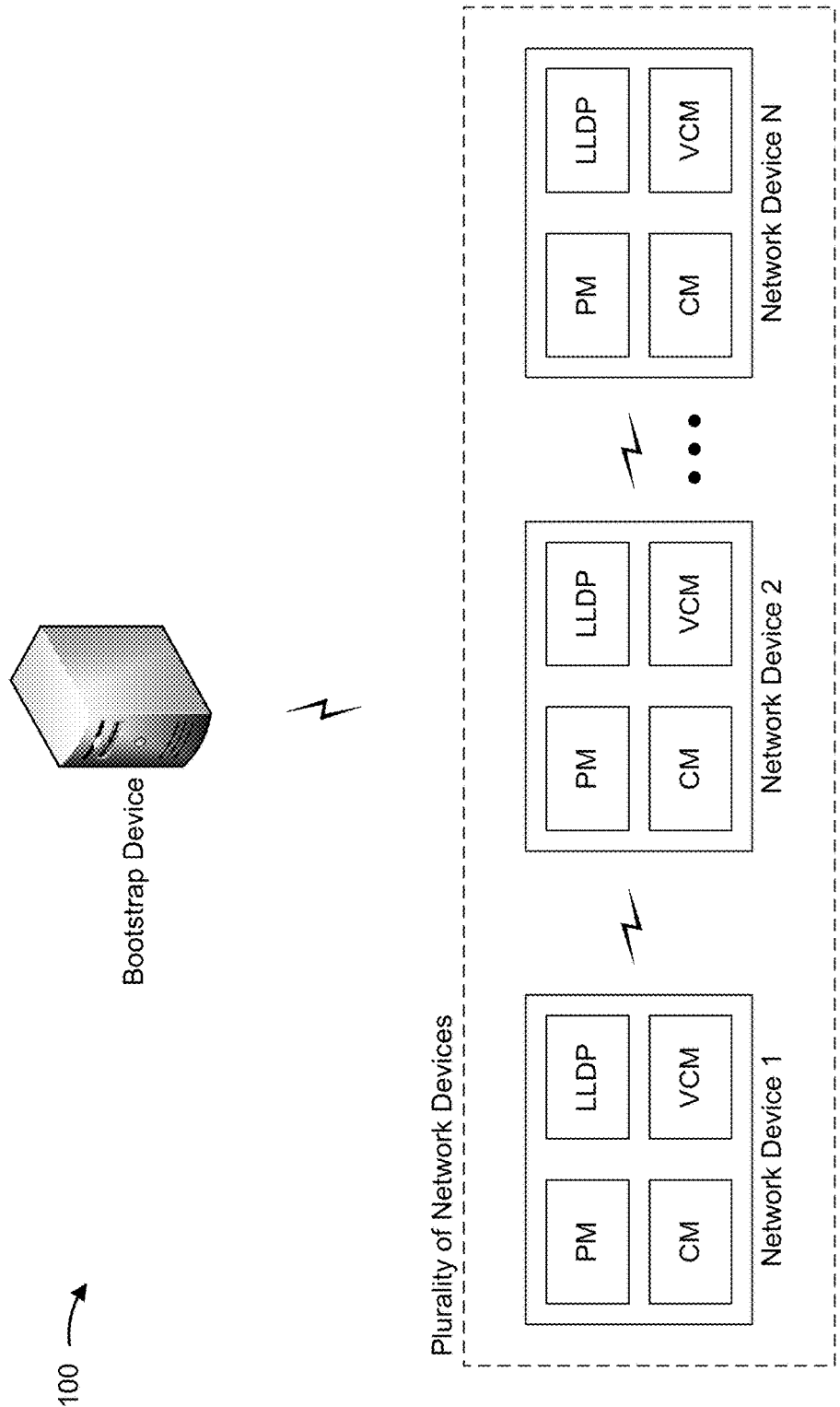
FIGS. 1A-1H are diagrams of one or more example implementations described herein.

The following detailed description of example implementations refers to the accompanying drawings. The same reference numbers in different drawings may identify the same or similar elements.

Zero Touch Provisioning (ZTP) may be useful for provisioning network devices upon deployment from a factory-default state. Network operators that deploy network devices configured for ZTP may reduce errors in the installation process by allowing the provisioning process to be automated and may reduce costs of manually provisioning the network devices by on-site operators. When a network device is coupled to power, the network device may communicate with a bootstrap device to obtain bootstrapping information (also referenced as "provisioning information") for provisioning the network device.

A virtual chassis is a group of network devices that are connected together to form a single logical network device. The group of network devices may be connected via respective virtual chassis interfaces that are configured to transmit virtual chassis specific control traffic between network devices of the group of network devices (e.g., to configure, maintain, operate, and/or the like a virtual chassis). When a network device is preconfigured with one or more virtual chassis interfaces, the network device may automatically be included in a virtual chassis when connected to another network device with one or more virtual chassis interfaces. However, in many cases, a network device is not preconfigured with any virtual chassis interfaces, and therefore cannot automatically be included in a virtual chassis. Accordingly, the network device may require manual configuration (e.g., to convert a network interface of the network device to a virtual chassis interface) to enable the network device to be included in a virtual chassis. This can be a resource intensive, time-consuming procedure that is susceptible to human error.

Some implementations described herein provide a network device that communicates with a bootstrap device to obtain information concerning a virtual chassis. In some implementations, the network device may determine that the network device and an additional network device are connected via respective network interfaces and that the network device and the additional network device are to be included in the virtual chassis. In some implementations, the network device may cause the network interface of the network device to be converted to a virtual chassis interface and cause the network interface of the additional network device to be converted to a virtual chassis interface, which may enable the network device and/or the additional network device to be automatically included in the virtual chassis.

In this way, some implementations described herein allow automatic formation of a virtual chassis. Further, some implementations described herein enable network devices that are not preconfigured with virtual chassis interfaces to be automatically provisioned (e.g., using an automatic provisioning process, also referred to as ZTP) with information to include the network devices in a virtual chassis. Accordingly, some implementations described herein can reduce an amount of time to initially configure network devices that are to be included in a virtual chassis, thereby improving performance of provisioning the network devices relative to using a manual provisioning process.

FIGS. 1A-1H are diagrams of one or more example implementations 100 described herein. As shown in FIG. 1A, example implementation(s) 100 may include a plurality of network devices (e.g., shown in FIG. 1A as network device 1 through network device N, where N is greater than or equal to two) and/or a bootstrap device. The plurality of network devices may each include various types of devices, such as a router, a gateway, a switch, a bridge, a wireless access point, a base station, a spine, a firewall, a policer, and/or the like. The plurality of network devices and/or the bootstrap device may be included in a network, such as a cellular network, a local area network (LAN), a core network, an access network, a wide area network (WAN) such as the Internet, a cloud network, and/or the like. In some implementations, the plurality of network devices may be connected to each other via one or more connections (e.g., via direct connections, via indirect connections, and/or the like). Additionally, or alternatively, at least one network device may be connected to the bootstrap device (e.g., via a direct connection and/or an indirect connection).

In some implementations, the plurality of network devices is to be included in a virtual chassis (e.g., a representation of the plurality of network devices as a single logical network device). Each network device may include a provisioning manager (PM) module (e.g., to manage provisioning of the network device), a link layer data protocol (LLDP) module (e.g., to communicate network traffic), a chassis manager (CM) module (e.g., to manage physical components of the network device), a virtual chassis manager (VCM) module (e.g., to manage virtual chassis aspects of the network device), and/or the like. In some implementations, the plurality of network devices may communicate with each other and/or the bootstrap device to form the virtual chassis, to include the plurality of network devices in the virtual chassis, and/or the like, as described herein.

The bootstrap device (also referred to as a server device, a Dynamic Host Configuration Protocol (DHCP) server device, and/or the like) may include and/or maintain a data structure that includes information concerning the virtual chassis, such as information identifying the virtual chassis (e.g., information indicating a name and/or identifier of the virtual chassis); information identifying a mode of the virtual chassis (e.g., information identifying whether the virtual chassis is a single-chassis virtual chassis, a multi-chassis virtual chassis, a cluster, and/or the like); information identifying two or more network devices to be included in the virtual chassis (e.g., information identifying respective identifiers of the plurality of network devices); information identifying at least one network interface of each network device, of the two or more network devices to be included in the virtual chassis, to be converted to a virtual chassis interface (e.g., information indicating which respective network interfaces of the plurality of network devices are to be converted to virtual chassis interfaces to enable formation of the virtual chassis); information indicating network interface conversion criteria (e.g., information indicating what type of network interface is preferred for conversion to a virtual chassis interface, such as a network interface that supports a data transmission speed that satisfies (e.g., is greater than or equal to) a threshold (e.g., 10 gigabits per second)); information identifying respective roles of the two or more network devices to be included in the virtual chassis (e.g., information indicating whether a network device, of the plurality of network devices, is to have a master routing engine role, a backup routing engine role, a linecard role, and/or the like in the virtual chassis); and/or the like.

Figure 1B:
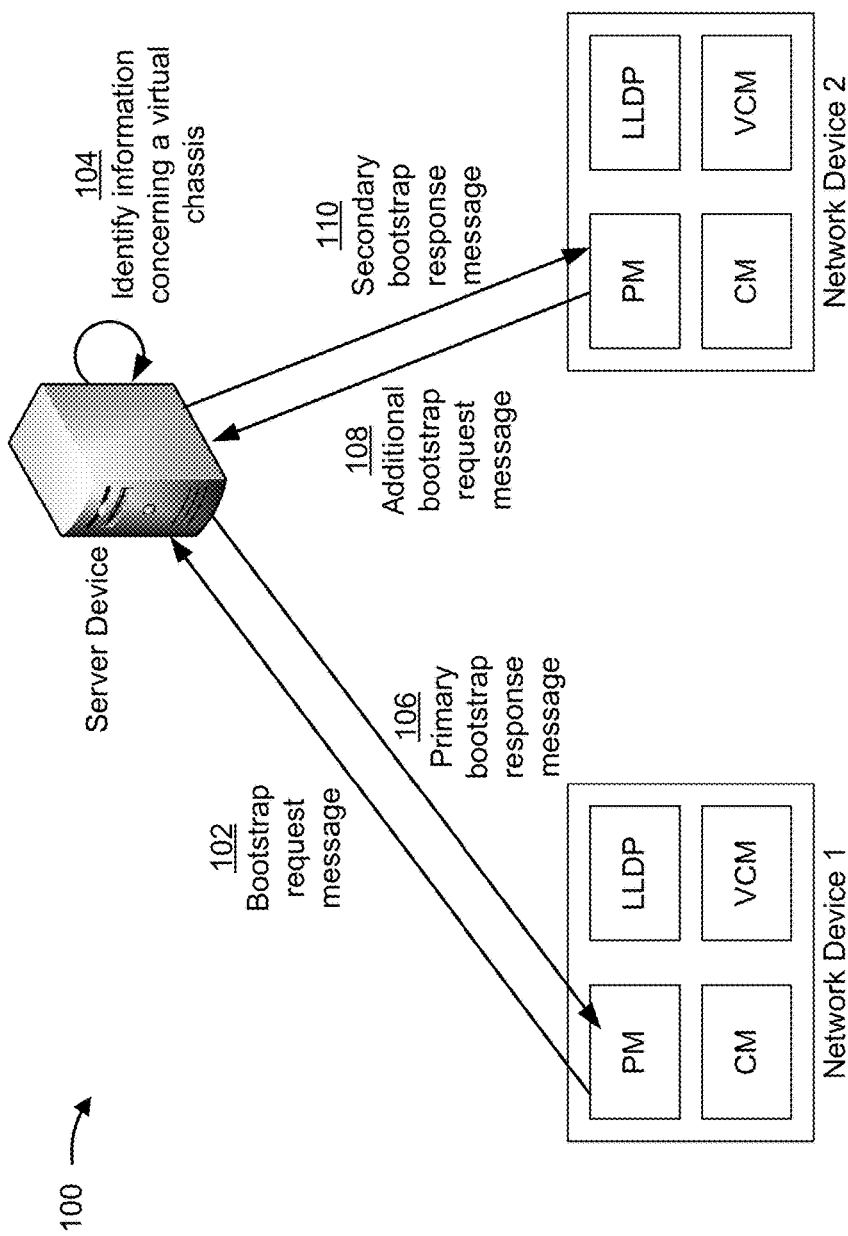

In some implementations, a network device, of the plurality of network devices, may generate and/or send a bootstrap request message to the bootstrap device. For example, as shown in FIG. 1B and by reference number 102, a first network device (e.g., network device 1) may generate and/or send (e.g., using a PM module of the first network device) a bootstrap request message to the bootstrap device (e.g., via a connection between the first network device and the bootstrap device). The first network device may generate and/or send the bootstrap request message to the bootstrap device when the first network device is powered on, when the first network device is added to the network, when the first network device is connected to at least one of the other network devices of the plurality of network devices, and/or the like.

The bootstrap request message may include a request for bootstrapping information (also referred to as provisioning information). Additionally, or alternatively, the request message may include information concerning the first network device, such as information identifying the first network device (e.g., a string, such as an alphanumeric serial number, that identifies the first network device), information identifying an operating system of the first network device (e.g., a name and/or version of the operating system), information identifying a hardware type of the first network device (e.g., a model name of the first network device, a hardware configuration of the first network device, and/or the like), and/or the like. An example bootstrap request message is further described herein in relation to FIG. 3A.

As shown by reference number 104, after receiving the bootstrap request message sent by the first network device, the bootstrap device may identify and/or determine the information concerning the virtual chassis (e.g., that is stored in the data structure that is included and/or maintained by the bootstrap device). For example, the bootstrap device may process (e.g., parse) the bootstrap request message to identify the information concerning the first network device, and may search the data structure to identify and/or determine the information concerning the virtual chassis.

As shown by reference number 106, the bootstrap device may generate and/or send a primary bootstrap response message that includes primary information concerning the virtual chassis (e.g., some or all of the information concerning the virtual chassis) to the first network device (e.g., to the PM module of the first network device). The primary information concerning the virtual chassis may include the information identifying the virtual chassis; the information identifying the mode of the virtual chassis; the information identifying the two or more network devices to be included in the virtual chassis (e.g., information identifying network devices 1 through N); the information identifying the at least one network interface of each network device, of the two or more network devices to be included in the virtual chassis, to be converted to a virtual chassis interface; the information indicating the network interface conversion criteria; the information identifying the respective roles of the two or more network devices to be included in the virtual chassis; and/or the like. An example primary bootstrap response message is further described herein in relation to FIG. 3B. After sending the primary bootstrap response message to the first network device, the bootstrap device may update the information concerning the virtual chassis to include information indicating that the primary bootstrap response message has been sent to the first network device.

In some implementations, one or more other network devices of the plurality of network devices may generate and/or send respective additional bootstrap request messages to the bootstrap device (e.g., after the first network device sends the bootstrap request message to the bootstrap device and/or after the bootstrap device receives and/or processes the bootstrap request message). For example, as shown by reference number 108, a second network device (e.g., network device 2) may generate and/or send (e.g., using a PM module of the second network device) an additional bootstrap request message to the bootstrap device. The second network device may generate and/or send the additional bootstrap request message to the bootstrap device when the second network device is powered on, when the second network device is added to the network, when the second network device is connected to at least one of the other network devices of the plurality of network devices, and/or the like.

The additional bootstrap request message may be similar to the bootstrap request message that was generated and/or sent by the first network device. For example, the additional bootstrap request message may include a request for bootstrapping information and may include information concerning the second network device, such as information identifying the second network device, information identifying an operating system of the second network device, information identifying a hardware type of the second network device, and/or the like.

After receiving the additional bootstrap request message sent by the second network device, the bootstrap device may identify and/or determine the information concerning the virtual chassis (e.g., that is stored in the data structure that is included and/or maintained by the bootstrap device) in a similar manner as described herein in relation to reference number 104. For example, the bootstrap device may process (e.g., parse) the additional bootstrap request message to identify the information concerning the second network device, and may search the data structure to identify and/or determine the information concerning the virtual chassis.

In some implementations, the bootstrap device may process the information concerning the virtual chassis to determine that a primary response message has already been sent (e.g., to the first network device). Accordingly, the bootstrap device may determine not to respond to the additional bootstrap request message. Additionally, or alternatively, as shown by reference number 110, the bootstrap device may generate and/or send a secondary bootstrap response message that includes secondary information concerning the virtual chassis (e.g., that includes some of the primary information concerning the virtual chassis) to the second network device (e.g., to the PM module of the second network device). For example, the secondary information concerning the virtual chassis may include the information identifying the virtual chassis, the information identifying the mode of the virtual chassis, and/or the like. An example secondary bootstrap response message is further described herein in relation to FIG. 3C.

Figure 1C:
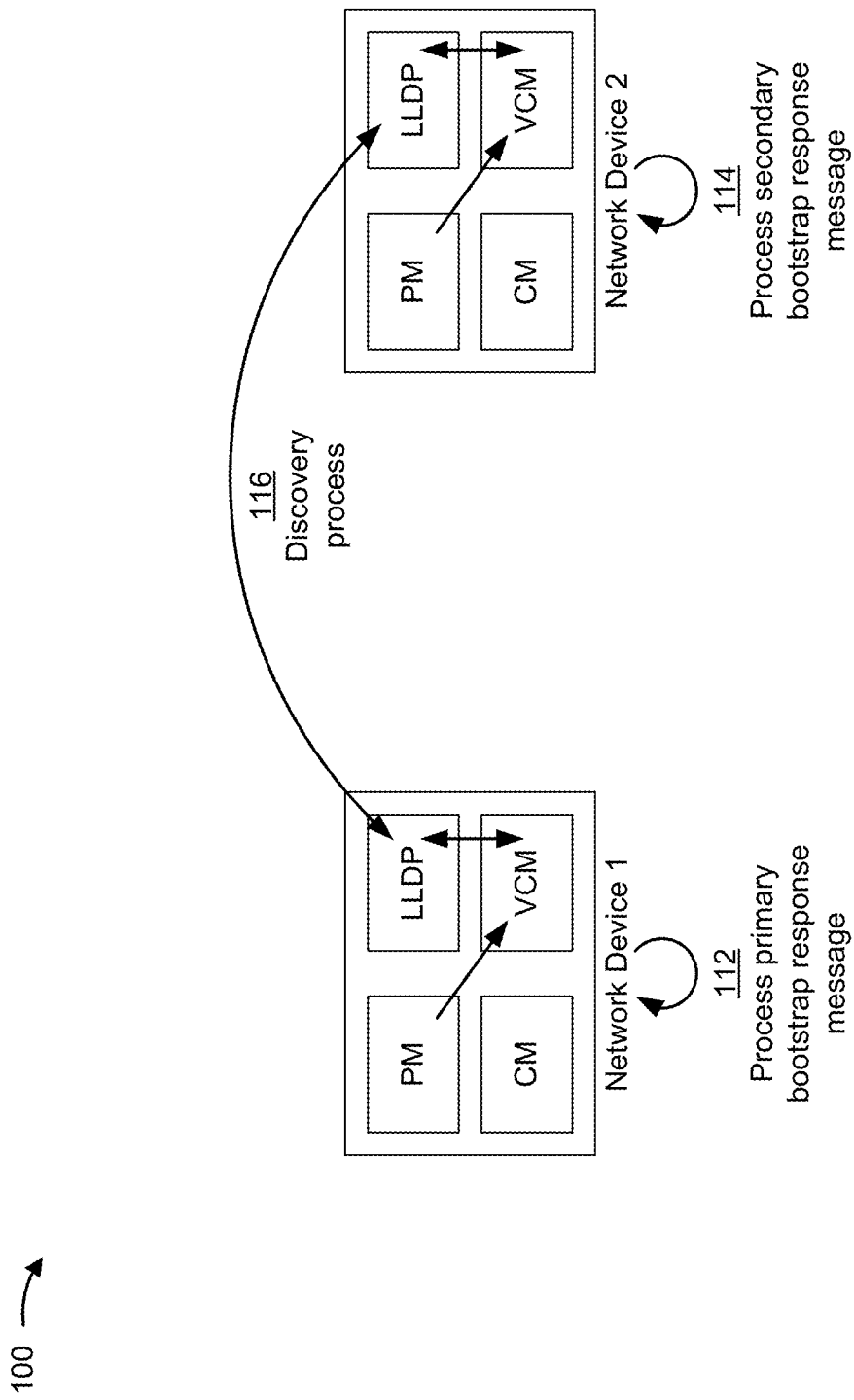

As shown in FIG. 1C and by reference number 112, after receiving the primary bootstrap response message, the first network device (e.g., using the PM module of the first network device) may process (e.g., parse) the primary bootstrap response message to determine and/or identify the primary information concerning the virtual chassis (e.g., that includes some or all of the information concerning the virtual chassis stored in the data structure of the bootstrap device). Additionally, or alternatively, as shown by reference number 114, after receiving the secondary bootstrap response message, the second network device (e.g., using the PM module of the second network device) may process (e.g., parse) the second bootstrap response message to determine and/or identify the secondary information concerning the virtual chassis (e.g., that includes some of the primary information concerning the virtual chassis).

As shown by reference number 116, the first network device and the second network device may engage in a discovery process to form the virtual chassis, to include (e.g., add) the first network device and/or the second network device to the virtual chassis, and/or the like. As part of the discovery process, the first network device may cause the PM module of the first network device to send the primary information concerning the virtual chassis to the VCM module of the first network device. Additionally, or alternatively, the second network device may cause the PM module of the second network device to send the secondary information concerning the virtual chassis to the VCM module of the second network device.

In some implementations, the first network device (e.g., using the VCM module of the first network device) may determine, based on the primary information concerning the virtual chassis, an identifier of the virtual chassis, respective identifiers of the plurality of network devices that are to be included in the virtual chassis, respective identifiers of network interfaces of the plurality of network devices, and/or the like. The first network device (e.g., using the VCM module) may generate a neighbor discovery request to determine which network device(s) of the plurality of network devices are connected to the first network device (e.g., directly connected to the first network device). The first network device may identify one or more network interfaces of the first network device and may cause the neighbor discovery request to be sent via at least one network interface of the one or more network interfaces. For example, the first network device may cause the VCM module of the first network device to identify one or more network interfaces of the first network device (e.g., based on the primary information concerning the virtual chassis). The first network device (e.g., using the VCM module) may select a particular network interface of the one or more network interfaces (e.g., based on the respective identifiers of network interfaces of the plurality of network devices, the information indicating network interface conversion criteria included in the primary information concerning the virtual chassis, and/or the like) and may send (e.g. using the LLDP module)

the neighbor discovery request via the particular network interface. The neighbor discovery request may be a vendor specific attribute (VSA) type-length-value (TLV), which may include the identifier of the virtual chassis, an identifier of the first network device, an identifier of the particular network interface of the first network device, and/or the like. In some implementations, the neighbor discovery request may transmit from the first network device to the second network device via a link that connects the particular network interface of the first network device to a particular network interface of the second network device.

The second network device may receive the neighbor discovery request via the particular network interface of the second network device. In some implementations, the second network device (e.g., using the LLDP module of the second network device) may process the neighbor discovery request to determine the identifier of the virtual chassis included in the neighbor discovery request. In some implementations, the second network device (e.g., using the LLDP module) may determine that the identifier of the virtual chassis included in the neighbor discovery request does not match the identifier of the virtual chassis included in the secondary information concerning the virtual chassis (e.g., that was included in the secondary bootstrap response message) and, accordingly, may determine to not send an acknowledgment to the first network device.

Additionally, or alternatively, the second network device (e.g., using the LLDP module) may determine to send a neighbor discovery request acknowledgment to the first network device. For example, the second network device (e.g., using the LLDP module) may determine that the identifier of the virtual chassis included in the neighbor discovery request matches the identifier of the virtual chassis included in the secondary information concerning the virtual chassis and, accordingly, may determine to send a neighbor discovery request acknowledgment to the first network device. The second network device (e.g., using the LLDP module) may generate the neighbor discovery request acknowledgment and may cause the neighbor discovery request acknowledgment to be sent (e.g., using the LLDP module) via the particular network interface of the second network device (e.g., that is connected to the particular network interface of the first network device) to the first network device. The neighbor discovery request acknowledgment may be a VSA TLV corresponding to an identifier of the second network device, an identifier of the particular network interface of the second network device, and/or the like. The neighbor discovery request acknowledgment may transmit from the second network device to the first network device via the link that connects the particular network interface of the second network device to the particular network interface of the first network device.

The first network device may receive the neighbor discovery request acknowledgment via the particular network interface of the first network device. The first network device (e.g., using the VCM module of the first network device) may cause the LLDP module of the first network device to send the neighbor discovery request acknowledgment to the VCM module of the first network device. In some implementations, the first network device (e.g., using the VCM module of the first network device) may process the neighbor discovery request acknowledgment to determine the identifier of the second network device. The first network device (e.g., using the VCM module) may determine that the identifier of the second network device matches one of the respective identifiers of the plurality of network devices that are to be included in the virtual chassis (e.g., that is included in the primary information concerning the virtual chassis) and may thereby determine that the first network device is connected to the second network device (e.g., via the link that connects the particular network interface of the first network device to the particular network interface of the second network device), that the second network device is one of the plurality of network devices to be included in the virtual chassis, and/or the like.

Additionally, or alternatively, the first network device (e.g., using the VCM module of the first network device) may process the neighbor discovery request acknowledgment to determine the identifier of the second network device and the particular network interface of the second network device. The first network device may determine that the identifier of the second network device matches one of the respective identifiers of the plurality of network devices that are to be included in the virtual chassis (e.g., that is included in the primary information concerning the virtual chassis) and/or that the particular network interface of the second network device matches one of the respective identifiers of network interfaces of the plurality of network devices (e.g., that is included in the primary information concerning the virtual chassis). Accordingly, the first network device (e.g., using the VCM module) may determine that the first network device is connected to the second network device, that the first network device is connected to the second network device as specified by the primary information concerning the virtual chassis (e.g., via the link that connects the particular network interface of the first network device to the particular network interface of the second network device), that the second network device is one of the plurality of network devices to be included in the virtual chassis, and/or the like.

Figure 1D:
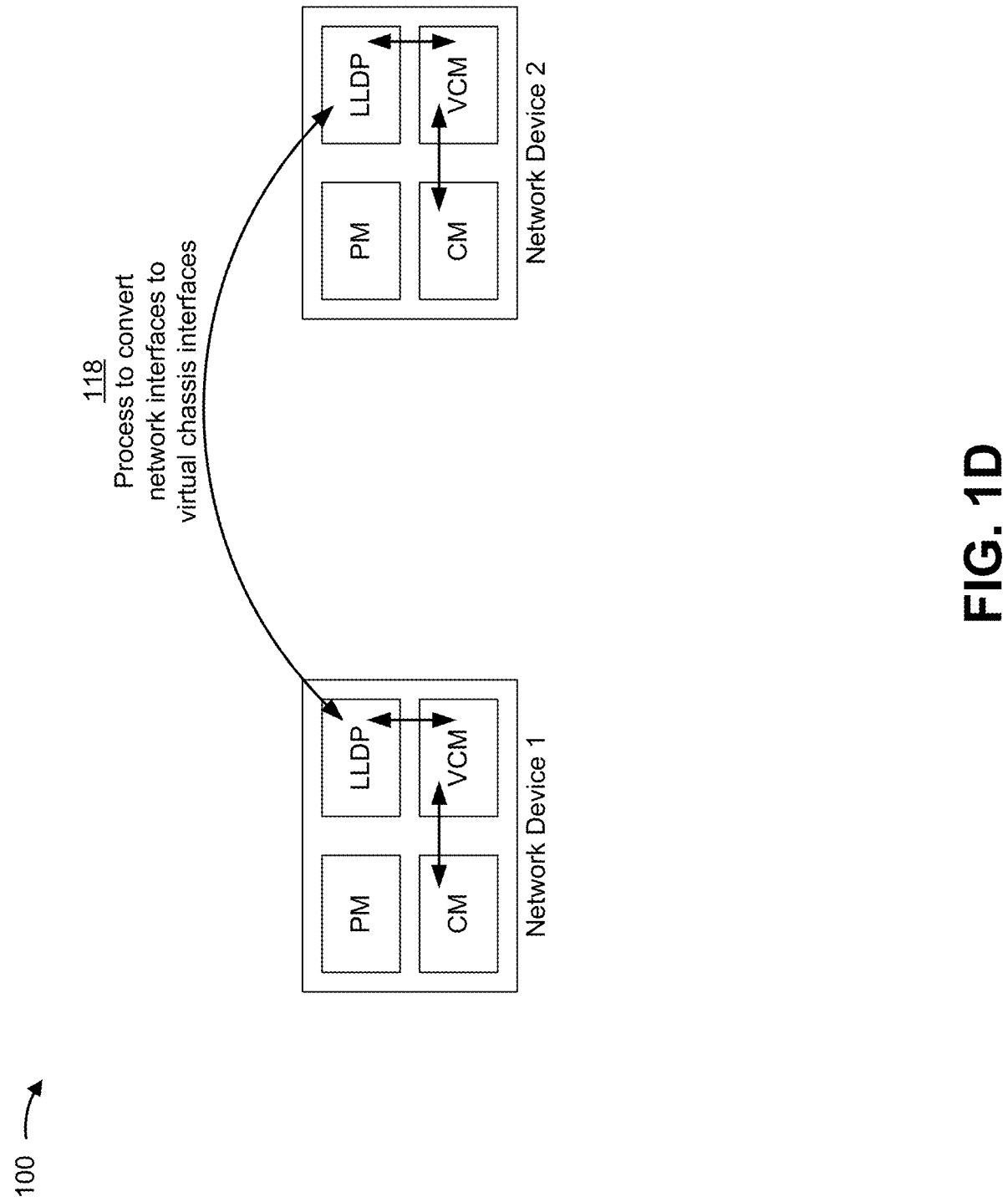

As shown in FIG. 1D by reference number 118, the first network device and/or the second network device may participate in a process to convert the particular network interface of the first network device to a virtual chassis interface (e.g., a particular virtual chassis interface of the first network device) and the particular network interface of the second network device to a virtual chassis interface (e.g., a particular virtual chassis interface of the second network device).

In some implementations, the first network device may cause the particular network interface of the second network device to be converted to the particular virtual chassis interface of the second network device. For example, the first network device (e.g., using the VCM of the first network device) may cause the LLDP module of the first network device to send a conversion request via the particular network interface of the first network device (e.g., prior to the particular network interface of the first network device being converted to the particular virtual chassis interface of the first network device). The conversion request may be a VSA TLV carried in an LLDP packet and may transmit from the first network device to the second network device via the link that connects the particular network interface of the first network device to the particular network interface of the second network device.

The second network device may receive the conversion request via the particular network interface of the second network device. The second network device (e.g., using the LLDP module of the second network device) may cause the LLDP module of the second network device to send the conversion request to the VCM module of the second network device. In some implementations, the second network device (e.g., using the VCM module) may generate a conversion request acknowledgment and may cause the conversion request acknowledgment to be sent (e.g., using the LLDP module) via the particular network interface of the second network device (e.g., that is connected to the particular network interface of the first network device) to the first network device. The conversion request acknowledgment may be a VSA TLV carried in an LLDP packet and may transmit from the second network device to the first network device via the link that connects the particular network interface of the second network device to the particular network interface of the first network device.

The first network device may receive the conversion request acknowledgment via the particular network interface of the first network device. The first network device may cause the LLDP module of the first network device to send the conversion request acknowledgment to the VCM module of the first network device. In some implementations, the first network device (e.g., using the VCM of the first network device), based on receiving the conversion request acknowledgment, may cause the LLDP module of the first network device to send a conversion command via the particular network interface of the first network device. The conversion command may be a VSA TLV included in an LLDP packet and may transmit from the first network device to the second network device via the link that connects the particular network interface of the first network device to the particular network interface of the second network device.

The second network device may receive the conversion command via the particular network interface of the second network device. The second network device (e.g., using the LLDP module of the second network device) may cause the LLDP module of the second network device to send the conversion command to the VCM module of the second network device. In some implementations, the second network device (e.g., using the VCM module) may send the conversion command to the CM module of the second network device, which may cause the CM module to convert the particular network interface of the second network device to the particular virtual chassis interface of the second network device. The second network device (e.g., using the CM module) may send a conversion command acknowledgment to the VCM module of the second network device to indicate that the particular virtual chassis interface has been established.

Additionally, or alternatively, the first network device, based on receiving the conversion request acknowledgment, may cause the particular network interface of the first network device to be converted to the particular virtual chassis interface of the first network device. For example, the first network device (e.g., using the VCM module) may send a conversion command to the CM module of the first network device, which may cause the CM module to convert the particular network interface of the first network device to the particular virtual chassis interface of the first network device. The first network device (e.g., using the CM module) may send a conversion command acknowledgment to the VCM module of the first network device to indicate that the particular virtual chassis interface has been established.

Figure 1E:
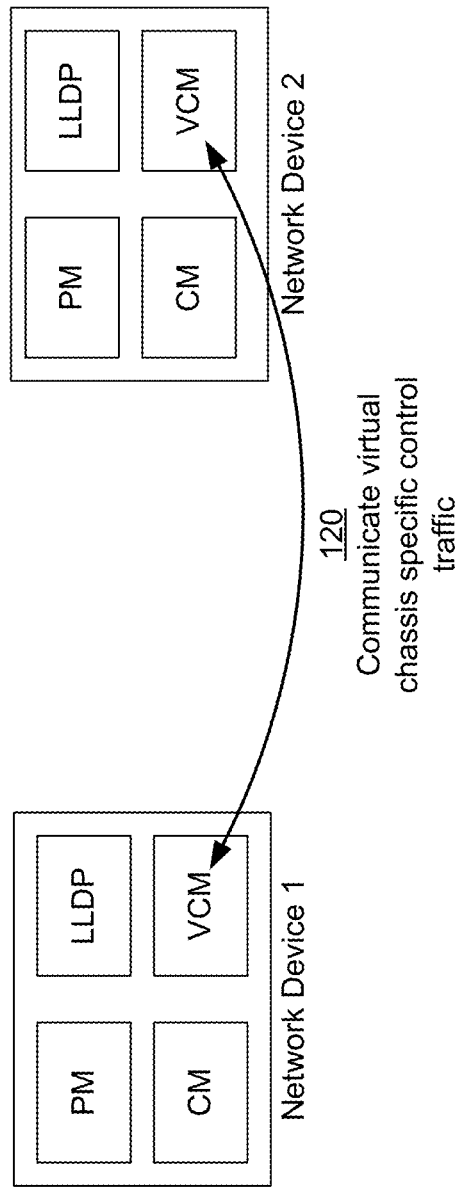

As shown in FIG. 1E and by reference number 120, the first network device (e.g., using the VCM module of the first network device) and the second network device (e.g., using the VCM module of the second network device) may communicate virtual chassis specific control traffic (e.g., traffic regarding formation, maintenance, operation, and/or the like of the virtual chassis). For example, the first network device and the second network device may communicate the virtual chassis specific control traffic via a link that connects the particular virtual chassis interface of the first network device to the particular virtual chassis interface of the second network device.

In some implementations, the first network device may determine, based on communicating with the second network device, that the virtual chassis has been formed, that the virtual chassis includes the first network device and/or the second network device, and/or the like. In some implementations, the first network device may send (e.g., based on determining that the virtual chassis has been formed, that the virtual chassis includes the first network device and/or the second network device, and/or the like) a virtual chassis report (e.g., concerning a status of the virtual chassis) to the bootstrap device, as further described herein in relation to FIG. 1H.

In some implementations, the first network device and the second network device may communicate virtual chassis specific control traffic to determine and/or assign a role to the first network device in the virtual chassis and/or a role to the second network device in the virtual chassis. The roles may include a master routing engine role, a backup routing engine role, a linecard role, and/or the like. For example, the first network device (e.g., using the VCM module of the first network device) may determine a first role for the first network device and a second role for the second network device based on the primary information concerning the virtual chassis (e.g., that was included in the primary bootstrap response message and that includes the information identifying the respective roles of the two or more network devices to be included in the virtual chassis). The first network device and the second network device may communicate virtual chassis specific control traffic to cause the first network device to be assigned the first role and the second network device to be assigned the second role. As another example, the primary information concerning the virtual chassis may not include any information concerning roles of network devices in the virtual chassis. Accordingly, the first network device and the second network device may communicate virtual chassis specific control traffic to determine a first role and a second role and to cause the first network device to be assigned the first role and the second network device to be assigned the second role.

In some implementations, one network device is assigned a master routing engine role, and the other network device is assigned a backup routing engine role, a linecard role, and/or the like. A network device of the virtual chassis that has the master routing engine role (e.g., the first network device or the second network device) may be referred to as a master routing network device of the virtual chassis. In some implementations, when the first network device is assigned the master routing engine role, the first network device stores the primary information concerning the virtual chassis at the VCM module of the first network device. Additionally, or alternatively, when the second network device is assigned the master routing engine role, the first network device may send the primary information concerning the virtual chassis to the second network device. For example, the VCM module of the first network device may send the primary information concerning the virtual chassis to the VCM module of the second network device via the link that connects the particular virtual chassis interface of the first network device to the particular virtual chassis interface of the second network device.

Figure 1F:
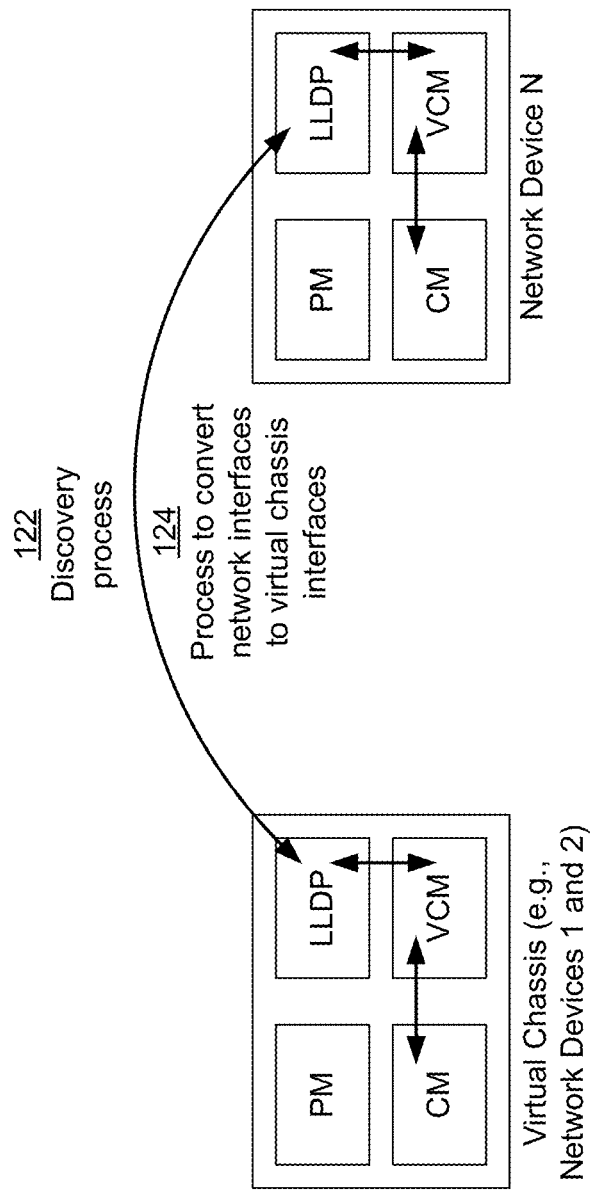

As shown in FIG. 1F and by reference number 122, a virtual chassis (e.g., comprising the first network device and the second network device) may engage in a discovery process with an additional network device (e.g., network device N) to add the additional network device to the virtual chassis. While some implementations described herein in relation to FIG. 1F describe the virtual chassis comprising just the first network device and the second network device, contemplated implementations include the virtual chassis comprising any number of network devices.

In some implementations, the master routing network device of the virtual chassis (e.g., either the first network device or the second network device) may generate a neighbor discovery request to determine which additional network device(s) of the plurality of network devices are connected to the network devices that comprise the virtual chassis (e.g., which additional network device(s) are directly connected to the first network device and/or the second network device). The master routing network device may identify one or more network interfaces of the network devices that comprise the virtual chassis and may cause the neighbor discovery request to be sent via at least one network interface of the one or more network interfaces. For example, the VCM module of the master routing network device may communicate with the respective LLDP modules of the network devices that comprise the virtual chassis to identify the one or more network interfaces of the network devices that comprise the virtual chassis and may cause a particular LLDP module of the respective LLDP modules to send the neighbor discovery request via a particular network interface of the one or more network interfaces. The neighbor discovery request packet may include a VSA TLV corresponding to an identifier of the virtual chassis, an identifier of the master routing network device, an identifier of a particular network device (e.g., either the first network device or the second network device) that includes the particular LLDP module, an identifier of the particular network interface of the particular network device, and/or the like. The neighbor discovery request may transmit from the particular network device to the additional network device via a link that connects the particular network interface of the particular network device (e.g., either the first network device or the second network device) to a particular network interface of the additional network device.

The additional network device may receive the neighbor discovery request via the particular network interface of the additional network device. The additional network device (e.g., using the VCM module of the additional network device) may process the neighbor discovery request and/or may send a neighbor discovery request acknowledgment to the particular network device in a similar manner as described herein in relation to FIG. 1C and reference number 116. The neighbor discovery request acknowledgment may be a VSA TLV corresponding to an identifier of the additional network device, an identifier of the particular network interface of the additional network device, and/or the like. The neighbor discovery request acknowledgment may transmit from the additional network device to the particular network device (e.g., either the first network device or the second network device) via the link that connects the particular network interface of the additional network device to the particular network interface of the particular network device.

The particular network device (e.g., either the first network device or the second network device) may receive the neighbor discovery request acknowledgment via the particular network interface of the particular network device. The master routing network device (e.g., using the VCM module of the master routing network device) may cause the LLDP module of the particular network device to send the neighbor discovery request acknowledgment to the VCM module of the master routing network device. The master routing network device (e.g., using the VCM module of the master routing network device) may process the neighbor discovery request acknowledgment to determine the identifier of the additional network device, the identifier of the particular network interface of the additional network device, and/or the like. The master routing network device (e.g., using the VCM module of the master routing network device) may determine that the identifier of the additional network device matches one of the respective identifiers of the plurality of network devices that are to be included in the virtual chassis (e.g., that is included in the primary information concerning the virtual chassis), that the particular network interface of the additional network device matches one of the respective identifiers of network interfaces of the plurality of network devices (e.g., that is included in the primary information concerning the virtual chassis), and/or the like. Accordingly, the master routing network device (e.g., using the VCM module of the master routing network device) may determine that the particular network device is connected to the additional network device, that the particular network device is connected to the additional network device as specified by the primary information concerning the virtual chassis (e.g., via the link that connects the particular network interface of the particular network device to the particular network interface of the additional network device), that the additional network device is one of the plurality of network devices to be included in the virtual chassis, and/or the like.

As shown by reference number 124, the network devices that comprise the virtual chassis and/or the additional network device may participate in a process to convert the particular network interface of the particular network device (e.g., either the first network device or the second network device) to a virtual chassis interface (e.g., a particular virtual chassis interface of the particular network device) and/or the particular network interface of the additional network device to a virtual chassis interface (e.g., a particular virtual chassis interface of the additional network device) in a similar manner as described herein in relation to FIG. 1D and reference number 118.

In some implementations, the master routing network device may cause the particular network interface of the additional network device to be converted to the particular virtual chassis interface of the additional network device. For example, the master routing network device (e.g., using the VCM of the master routing network device) may cause the LLDP module of the particular network device to send a conversion request via the particular network interface of the particular network device (e.g., prior to the particular network interface of the particular network device being converted to the particular virtual chassis interface of the particular network device). The conversion request may be a VSA TLV carried in an LLDP packet and may transmit from the particular network device to the additional network device via the link that connects the particular network interface of the particular network device to the particular network interface of the additional network device.

The additional network device may receive the conversion request via the particular network interface of the additional network device. The additional network device (e.g., using the LLDP module of the additional network device) may cause the LLDP module of the additional network device to send the conversion request to the VCM module of the additional network device. In some implementations, the additional network device (e.g., using the VCM module of the additional network device) may generate a conversion request acknowledgment and may cause the conversion request acknowledgment to be sent (e.g., using the LLDP module) via the particular network interface of the additional network device (e.g., that is connected to the particular network interface of the particular network device via the link and upon which the conversion request was received) to the particular network device. The conversion request acknowledgment may be a VSA TLV carried in an LLDP packet and may transmit from the additional network device to the particular network device via the link that connects the particular network interface of the additional network device to the particular network interface of the particular network device.

The particular network device (e.g., either the first network device or the second network device) may receive the conversion request acknowledgment via the particular network interface of the particular network device. The master routing network device (e.g., using the VCM module of the master routing network device) may cause the LLDP module of the particular network device to send the conversion request acknowledgment to the VCM module of the master routing network device. In some implementations, the master routing network device (e.g., using the VCM of the master routing network device), based on receiving the conversion request acknowledgment, may cause the LLDP module of the master routing network device to send a conversion command via the particular network interface of the particular network device. The conversion command may be a VSA TLV carried in an LLDP packet and may transmit from the particular network device to the additional network device via the link that connects the particular network interface of the particular network device to the particular network interface of the additional network device.

The additional network device may receive the conversion command via the particular network interface of the additional network device. The additional network device (e.g., using the LLDP module of the additional network device) may cause the LLDP module of the additional network device to send the conversion command to the VCM module of the additional network device. In some implementations, the additional network device (e.g., using the VCM module) may send the conversion command to the CM module of the additional network device, which may cause the CM module to convert the particular network interface of the additional network device to the particular virtual chassis interface of the additional network device. The additional network device (e.g., using the CM module) may send a conversion command acknowledgment to the VCM module of the additional network device to indicate that the particular virtual chassis interface has been established.

Additionally, or alternatively, the master routing network device, based on receiving the conversion request acknowledgment, may cause the particular network interface of the particular network device to be converted to the particular virtual chassis interface of the particular network device. For example, the master routing network device (e.g., using the VCM module of the master routing network device) may send a conversion command to the CM module of the particular network device, which may cause the CM module to convert the particular network interface of the particular network device to the particular virtual chassis interface of the particular network device.

Figure 1G:
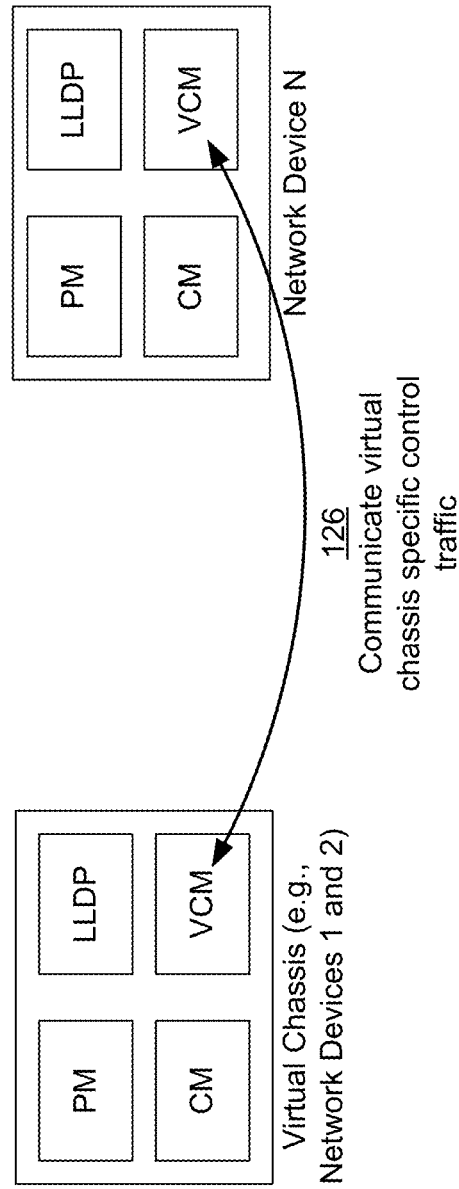

As shown in FIG. 1G and by reference number 126, the network devices of the virtual chassis (e.g., the first network device and the second network device) and the additional network device may communicate virtual chassis specific control traffic (e.g., traffic regarding formation, maintenance, operation, and/or the like of the virtual chassis). For example, the particular network device (e.g., using the VCM module of the particular network device) and the additional network device (e.g., using the VCM module of the additional network device) may communicate the virtual chassis specific control traffic via a link that connects the particular virtual chassis interface of the particular network device to the particular virtual chassis interface of the additional network device. In this way, the additional network device may be added to the virtual chassis.

In some implementations, the master routing network device (e.g., using the VCM module of the master routing network device) may determine, based on the particular network device and the additional network device communicating the virtual chassis specific control traffic, that the virtual chassis has been expanded, that the virtual chassis includes the additional network device, and/or the like. Accordingly, in some implementations, the master routing network device may assign a role to the additional network device in the virtual chassis (e.g., based on the primary information concerning the virtual chassis).

Figure 1H:
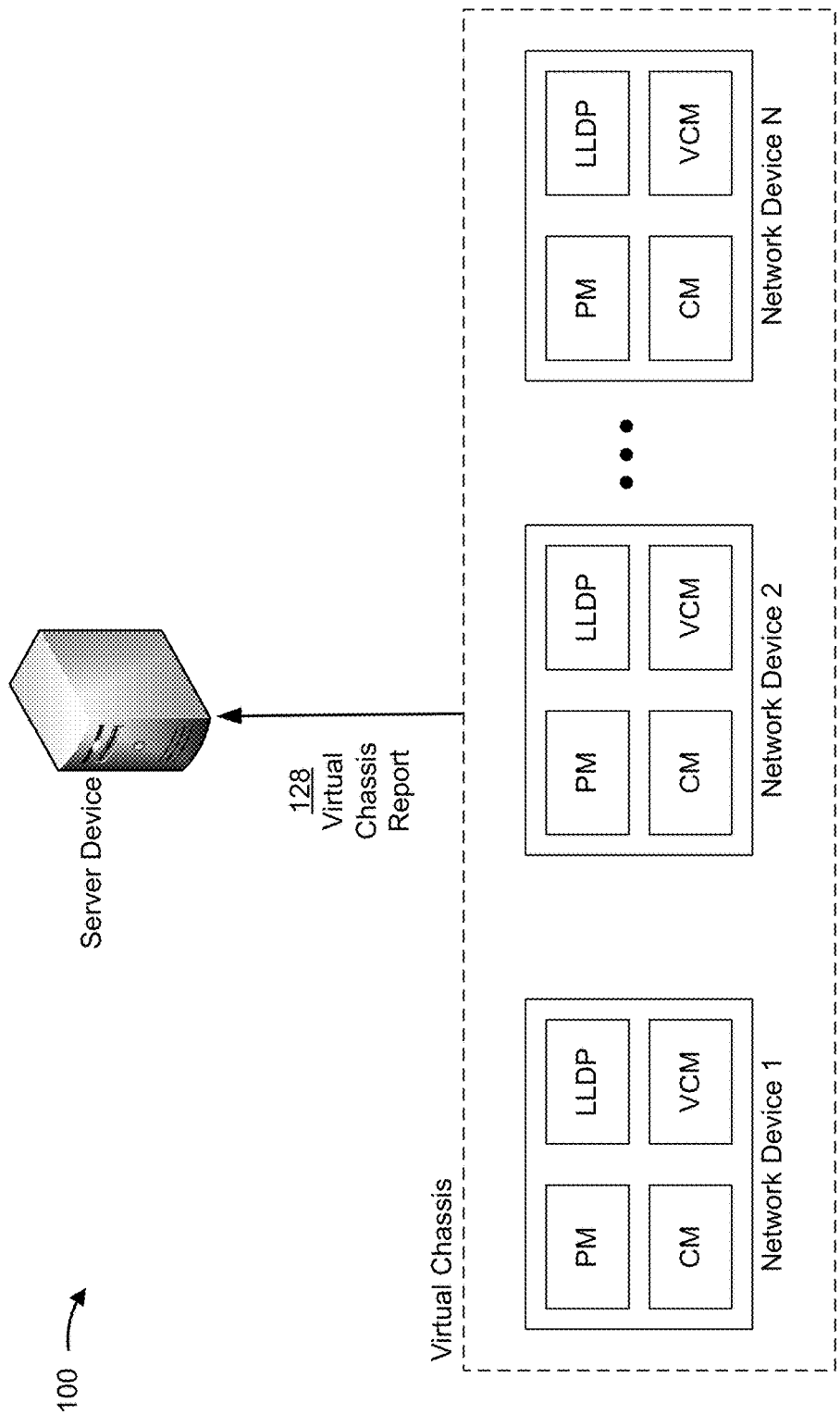

As shown in FIG. 1H and by reference number 128, a network device of the virtual chassis (e.g., the master routing network device) may send a virtual chassis report to the bootstrap device. The virtual chassis report may indicate a status of the virtual chassis. For example, the virtual chassis report may indicate whether the virtual chassis is partially or fully formed (e.g., based on whether each of the plurality of network devices indicated in the primary information concerning the virtual chassis have been determined to be included in the virtual chassis). As another example, the virtual chassis report may indicate a status, a performance, and/or the like of each network device of the virtual chassis.

As indicated above, FIGS. 1A-1H are provided merely as one or more examples. Other examples may differ from what is described with regard to FIGS. 1A-1H.

Figure 2:
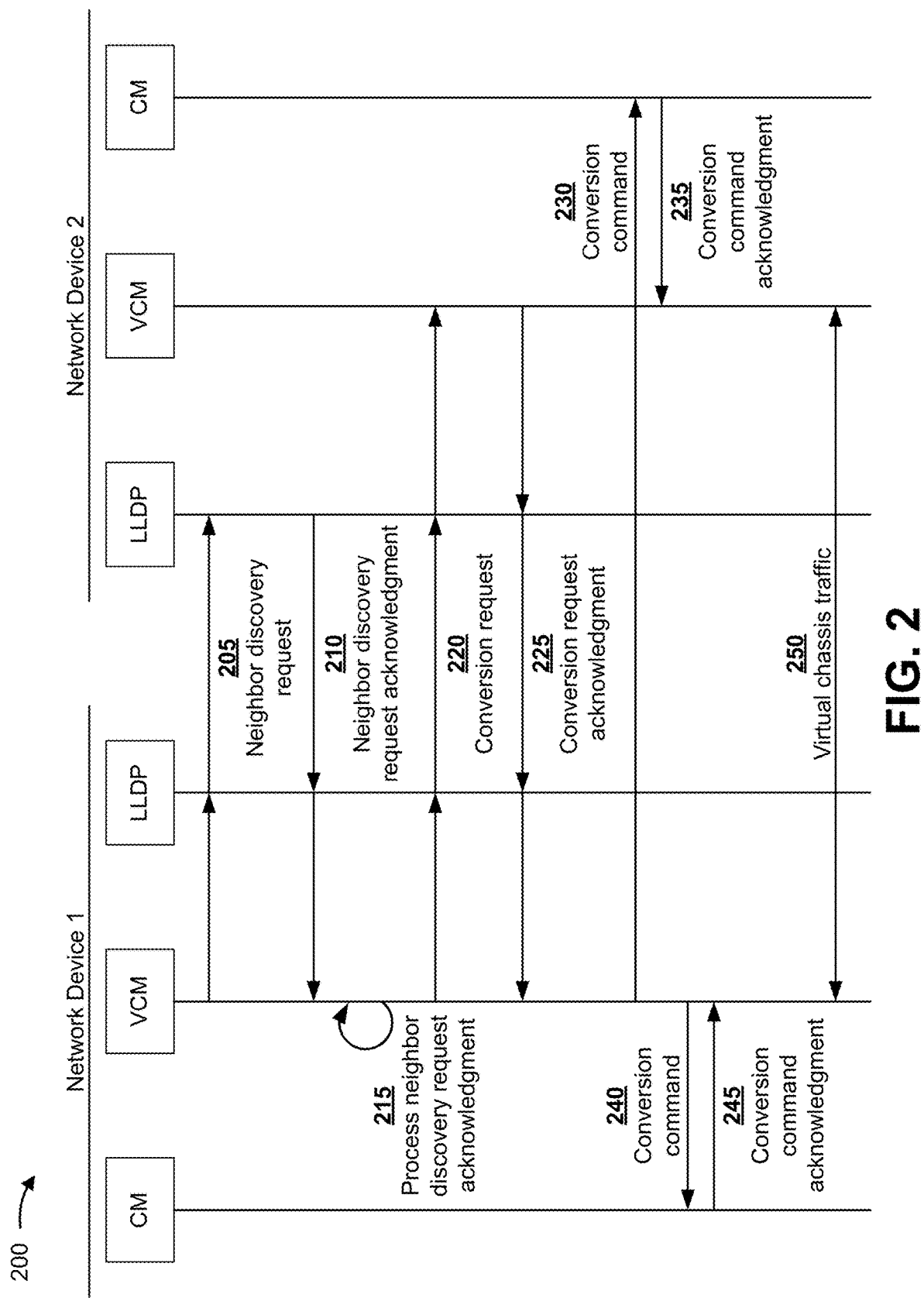
FIG. 2 is a diagram of an example call flow of example operations capable of being performed by one or more devices of FIGS. 1C-1E.

FIG. 2 is a diagram of an example call flow 200 of example operations capable of being performed by one or more devices of FIGS. 1C-1E. As shown in FIG. 2, one or more modules of the first network device (e.g., network device 1) and/or one or more modules of the second network device (e.g., network device 2) may be used to perform the example operations.

As shown by reference number 205, the first network device (e.g., using the VCM module and/or the LLDP module of the first network device) may generate and send a neighbor discovery request (e.g., to discover the second network device) to the second network device in a similar manner as described herein in relation to FIG. 1C and reference number 116. As shown by reference number 210, the second network device (e.g., using the LLDP module of the second network device) may generate and send a neighbor discovery request acknowledgment to the first network device in a similar manner as described herein in relation to FIG. 1C and reference number 116. As shown by reference number 215, the first network device (e.g., using the VCM module of the first network device) may process the neighbor discovery request acknowledgment (e.g., to determine that the first network device is connected to the second network device and/or that the first network device and/or the second is to be included in a virtual chassis) in a similar manner as described herein in relation to FIG. 1C and reference number 116.

As shown by reference number 220, the first network device (e.g., using the VCM module and/or the LLDP module of the first network device) may generate and send a conversion request (e.g., to initiate conversion of a network interface of the second network device into a virtual chassis interface) in a similar manner as described herein in relation to FIG. 1D and reference number 118. As shown by reference number 225, the second network device (e.g., using the VCM module and/or the LLDP module of the second network device) may generate and send a conversion acknowledgment to the first network device in a similar manner as described herein in relation to FIG. 1D and reference number 118.

As shown by reference number 230, the first network device (e.g., using the VCM module and/or the LLDP module of the first network device) may generate and send a conversion command to the second network device (e.g., to cause the CM module of the second network device to convert a network interface of the second network device to a virtual chassis interface) in a similar manner as described herein in relation to FIG. 1D and reference number 118. As shown by reference number 235, the second network device (e.g., using the CM module of the second network device) may send a conversion command acknowledgment to the VCM module of the second network device (e.g., to indicate that the virtual chassis interface of the second network device has been established) in a similar manner as described herein in relation to FIG. 1D and reference number 118.

As shown by reference number 240, the first network device (e.g., using the VCM module of the first network device) may send a conversion command to the CM module of the first network device (e.g., to cause the CM module to convert a network interface of the first network device to a virtual chassis interface) in a similar manner as described herein in relation to FIG. 1D and reference number 118. As shown by reference number 245, the first network device (e.g., using the CM module of the first network device) may send a conversion command acknowledgment to the VCM module of the first network device (e.g., to indicate that the virtual chassis interface of the first network device has been established) in a similar manner as described herein in relation to FIG. 1D and reference number 118. As shown by reference number 250, the first network device (e.g., using the VCM module of the first network device) and the second network device (e.g., using the VCM module of the second network device) may communicate virtual chassis specific control traffic in a similar manner as described herein in relation to FIG. 1E and reference number 120.

As indicated above, FIG. 2 is provided merely as an example. Other examples can differ from what is described with regard to FIG. 2.

FIGS. 3A-3D depict example messages described herein. As shown in FIG. 3A, an example bootstrap request message 300 may include an "input" heading that includes one or more fields. As shown in FIG. 3A, the one or more fields may include an "os-name" field and an "os-version" field (e.g., that indicate an operating system and version of the operating system of the network device sending the example bootstrap request message 300) and/or an "hw-model" field (e.g., that indicates a hardware type of the network device). Other headings, subheadings, and/or fields may be included in the example bootstrap request message 300.

As shown in FIG. 3B, an example primary bootstrap response message 310 may include an "output" heading that includes a "topology-discovery-info" subheading (e.g., that indicates information concerning a virtual chassis). As shown in FIG. 3B, the "topology-discovery-info" subheading may include a "topology-identifier" field (e.g., that identifies the virtual chassis) and a "mode" field (e.g., that identifies the mode of the virtual chassis). The "topology-discovery-info" subheading may include a "configuration" subheading that includes one or more configuration preference fields, such as a "10g_preferred" field (e.g., that indicates a preference for converting network interfaces that support a data transmission speed of at least 10 gigabits per second to virtual chassis interfaces), a "prevent_Loop" field (e.g., that indicates a preference to not create multiple virtual chassis links between two network devices), and/or the like. The "configuration" subheading may include one or more "node" subheadings (e.g., that respectively include information concerning a network device that is to be included in the virtual chassis). A "node" subheading may include a "serial-id" field (e.g., that indicate an identifier of a network device), a "role" field (e.g., that indicates a role of the network device in the virtual chassis), an "interfaces" field (e.g., that indicates one or more network interfaces of the network device that are to be converted to virtual chassis interfaces), and/or the like. Other headings, subheadings, and/or fields may be included in the example primary bootstrap response message 310.

As shown in FIG. 3C, an example secondary bootstrap response message 320 may include an "output" heading that includes a "topology-discovery-info" subheading (e.g., that indicates information concerning a virtual chassis). As shown in FIG. 3B, the "topology-discovery-info" subheading may include a "topology-identifier" field (e.g., that identifies the virtual chassis) and a "mode" field (e.g., that identifies the mode of the virtual chassis). Other headings, subheadings, and/or fields may be included in the example secondary bootstrap response message 320.

As shown in FIG. 3D, an example virtual chassis report 330 may include an "input" heading that includes a "progress-type" field (e.g., that indicates a formation status of a virtual chassis), a "topology-identifier" field (e.g., that identifies the virtual chassis), a "message" field (e.g., that may include information concerning a status, a performance, and/or the like of the virtual chassis), a "nodes" field (e.g., that identifies the network devices that comprise the virtual chassis), and/or the like. Other headings, subheadings, and/or fields may be included in the example virtual chassis report 330.

As indicated above, FIGS. 3A-3D are provided merely as one or more examples. Other examples may differ from what is described with regard to FIGS. 3A-3D.

Figure 4:
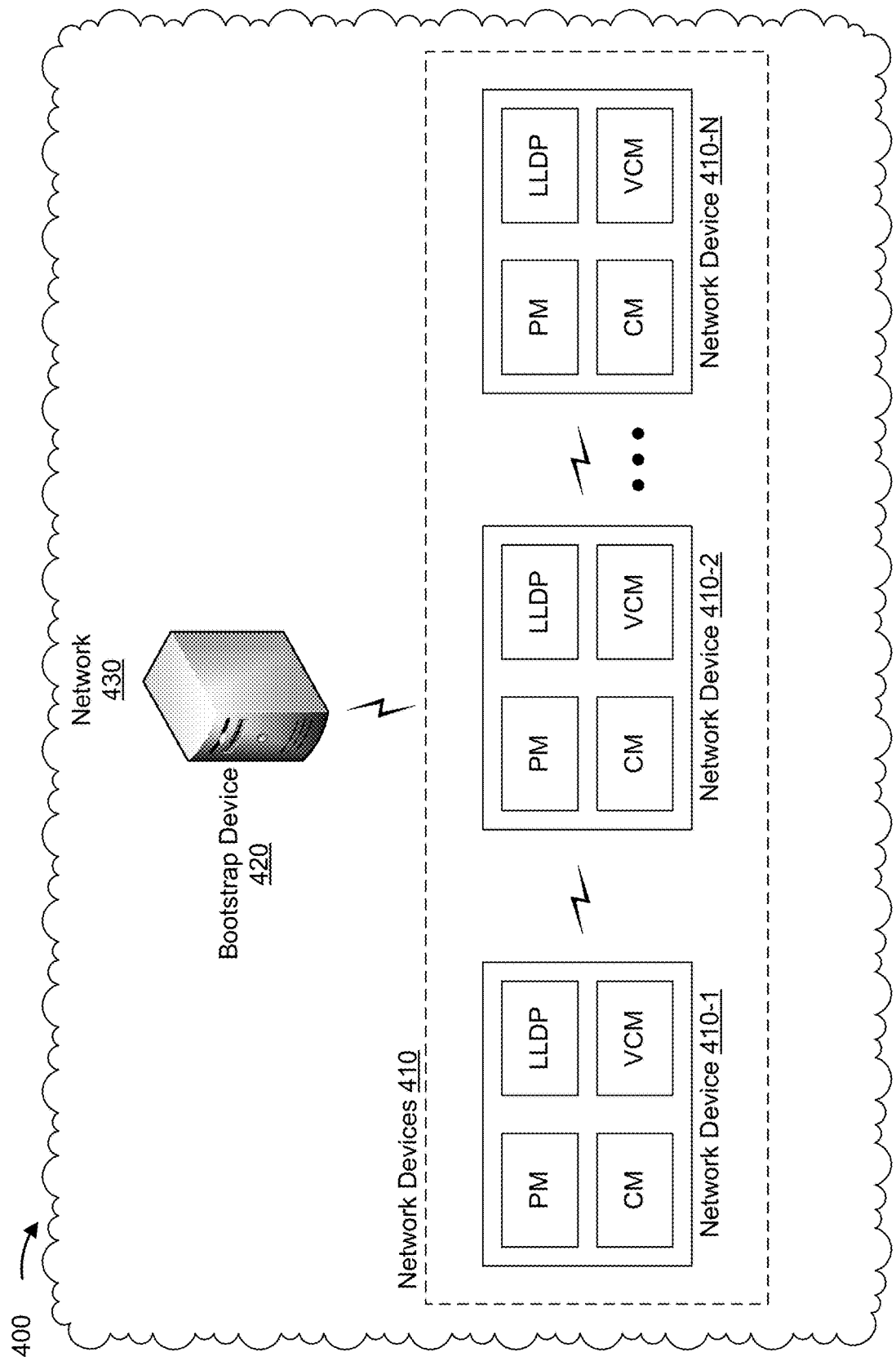
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a plurality of network devices 410 (e.g., network device 410-1 through network device 410-N, referred to collectively as "network devices 410" and singularly as "network device 410"), a bootstrap device 420, and a network 430. Devices of environment 400 may interconnect via wired connections, wireless connections, or a combination of wired and wireless connections.

Network device 410 includes one or more devices capable of receiving, storing, generating, processing, forwarding, and/or transferring information in a manner described herein. For example, network device 410 may include a firewall, a router, a gateway, a switch, a hub, a bridge, a reverse proxy, a server (e.g., a proxy server), a security device, an intrusion detection device, a load balancer, or a similar type of device. In some implementations, network device 410 may be a physical device implemented within a housing, such as a chassis. In some implementations, network device 410 may be a virtual device implemented by one or more computer devices of a cloud computing environment or a data center. In some implementations, network device 410 may include a provisioning manager (PM) module (e.g., to manage provisioning of network device 410), a link layer data protocol (LLDP) module (e.g., to communicate network traffic), a chassis manager (CM) module (e.g., to manage physical components of network device 410), a virtual chassis manager (VCM) module (e.g., to manage virtual chassis aspects of network device 410), and/or the like.

Bootstrap device 420 includes one or more devices capable of storing, processing, and/or routing information, such as information described herein. In some implementations, bootstrap device 420 may include a communication interface that allows bootstrap device 420 to receive information from and/or transmit information to network device 410. In some implementations, bootstrap device 420 may be a server device, a DHCP server device, a data storage device, or a similar device. In some implementations, bootstrap device 420 may include and/or maintain a data structure that includes information concerning a virtual chassis.

Network 430 includes one or more wired and/or wireless networks. For example, network 430 may include a cellular network (e.g., a long-term evolution (LTE) network, a 4G network, a 5G network, a New Radio (NR) network, a code division multiple access (CDMA) network, and/or the like), a public land mobile network (PLMN), a local area network (LAN), a wide area network (WAN), a metropolitan area network (MAN), a telephone network (e.g., the Public Switched Telephone Network (PSTN)), an Ethernet network, a VPN (E.g., a VPLS, an EVPN, a VPWS, an L2VPN, an L4VPN, and/or the like), a private network, an ad hoc network, an intranet, the Internet, a fiber optic-based network, a cloud computing network, or the like, and/or a combination of these or other types of networks.

The number and arrangement of devices and networks shown in FIG. 4 are provided as one or more examples. In practice, there may be additional devices, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5A:
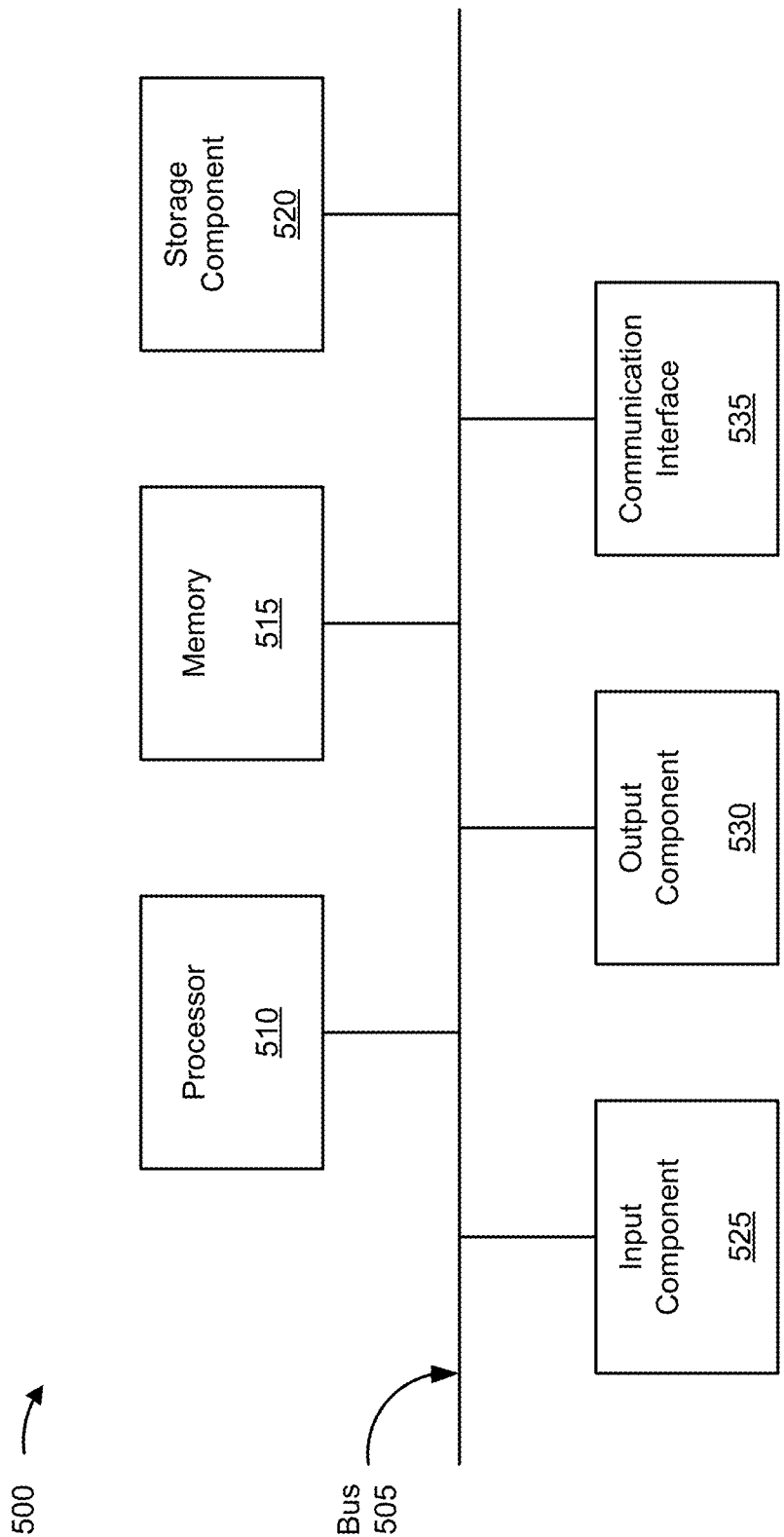
FIGS. 5A-5B are diagrams of example components of one or more devices of FIG. 4.
Figure 5B:
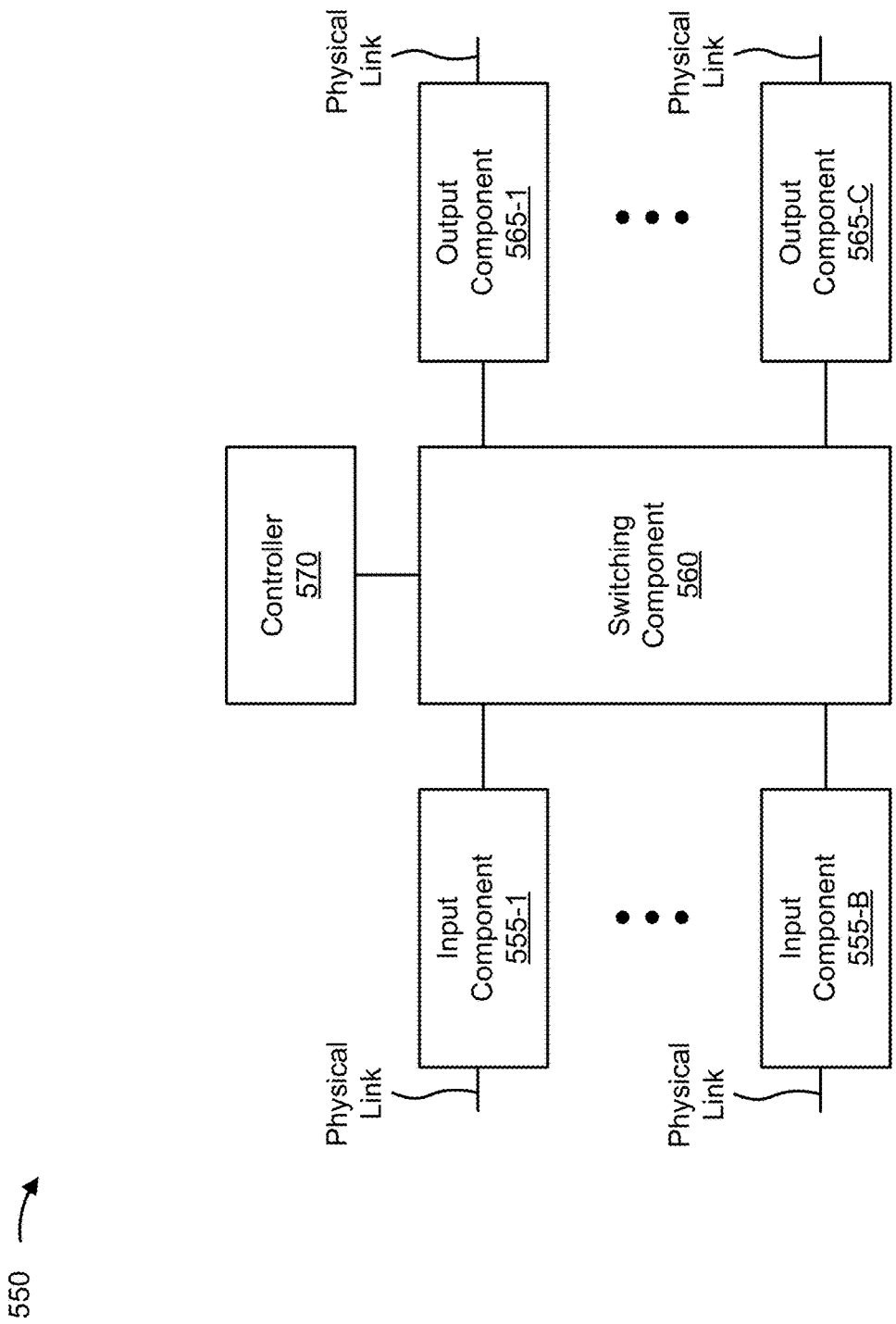

FIGS. 5A-5B are diagrams of example components of one or more devices of FIG. 4. FIG. 5A is a diagram of example components of a device 500. Device 500 may correspond to network device 410, bootstrap device 420, and/or the like. In some implementations, network device 410, bootstrap device 420, and/or the like may include one or more devices 500 and/or one or more components of device 500. As shown in FIG. 5A, device 500 may include a bus 505, a processor 510, a memory 515, a storage component 520, an input component 525, an output component 530, and a communication interface 535.

Bus 505 includes a component that permits communication among the components of device 500. Processor 510 is implemented in hardware, firmware, or a combination of hardware and software. Processor 510 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 510 includes one or more processors capable of being programmed to perform a function. Memory 515 includes a random access memory (RAM), a read only memory (ROM), and/or another type of dynamic or static storage device (e.g., a flash memory, a magnetic memory, and/or an optical memory) that stores information and/or instructions for use by processor 510.

Storage component 520 stores information and/or software related to the operation and use of device 500. For example, storage component 520 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 525 includes a component that permits device 500 to receive information, such as via user input (e.g., a touch screen display, a keyboard, a keypad, a mouse, a button, a switch, and/or a microphone). Additionally, or alternatively, input component 525 may include a sensor for sensing information (e.g., a global positioning system (GPS) component, an accelerometer, a gyroscope, and/or an actuator). Output component 530 includes a component that provides output information from device 500 (e.g., a display, a speaker, and/or one or more light-emitting diodes (LEDs)).

Communication interface 535 includes a transceiver-like component (e.g., a transceiver and/or a separate receiver and transmitter) that enables device 500 to communicate with other devices, such as via a wired connection, a wireless connection, or a combination of wired and wireless connections. Communication interface 535 may permit device 500 to receive information from another device and/or provide information to another device. For example, communication interface 535 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes based on processor 510 executing software instructions stored by a non-transitory computer-readable medium, such as memory 515 and/or storage component 520. A computer-readable medium is defined herein as a non-transitory memory device. A memory device includes memory space within a single physical storage device or memory space spread across multiple physical storage devices.

Software instructions may be read into memory 515 and/or storage component 520 from another computer-readable medium or from another device via communication interface 535. When executed, software instructions stored in memory 515 and/or storage component 520 may cause processor 510 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5A are provided as an example. In practice, device 500 may include additional components, fewer components, different components, or differently arranged components than those shown in FIG. 5A. Additionally, or alternatively, a set of components (e.g., one or more components) of device 500 may perform one or more functions described as being performed by another set of components of device 500.

FIG. 5B is a diagram of example components of a device 550. Device 550 may correspond to network device 410, bootstrap device 420, and/or the like. In some implementations, network device 410, bootstrap device 420, and/or the like may include one or more devices 550 and/or one or more components of device 550. As shown in FIG. 5B, device 550 may include one or more input components 555-1 through 555-B (B≥1) (hereinafter referred to collectively as input components 555, and individually as input component 555), a switching component 560, one or more output components 565-1 through 565-C (C≥1) (hereinafter referred to collectively as output components 565, and individually as output component 565), and a controller 570.

Input components 555 may be points of attachment for physical links and may be points of entry for incoming traffic, such as packets. Input component 555 may process incoming traffic, such as by performing data link layer encapsulation or decapsulation. In some implementations, input component 555 may send and/or receive packets. In some implementations, input component 555 may include an input line card that includes one or more packet processing components (e.g., in the form of integrated circuits), such as one or more interface cards (IFCs), packet forwarding components, line card controller components, input ports, processors, memories, and/or input queues. In some implementations, device 550 may include one or more input components 555.

Switching component 560 may interconnect input components 555 with output components 565. In some implementations, switching component 560 may be implemented via one or more crossbars, via busses, and/or with shared memories. The shared memories may act as temporary buffers to store packets from input components 555 before the packets are eventually scheduled for delivery to output components 565. In some implementations, switching component 560 may enable input components 555, output components 565, and/or controller 570 to communicate.

Output component 565 may store packets and may schedule packets for transmission on output physical links. Output component 565 may support data link layer encapsulation or decapsulation, and/or a variety of higher-level protocols. In some implementations, output component 565 may send packets and/or receive packets. In some implementations, output component 565 may include an output line card that includes one or more packet processing components (e.g., in the form of integrated circuits), such as one or more IFCs, packet forwarding components, line card controller components, output ports, processors, memories, and/or output queues. In some implementations, device 550 may include one or more output components 565. In some implementations, input component 555 and output component 565 may be implemented by the same set of components (e.g., and input/output component may be a combination of input component 555 and output component 565).

Controller 570 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 570 may include one or more processors that can be programmed to perform a function.

In some implementations, controller 570 may include a RAM, a ROM, and/or another type of dynamic or static storage device (e.g., a flash memory, a magnetic memory, an optical memory, and/or the like) that stores information and/or instructions for use by controller 570.

In some implementations, controller 570 may communicate with other devices, networks, and/or systems connected to device 500 to exchange information regarding network topology. Controller 570 may create routing tables based on the network topology information, create forwarding tables based on the routing tables, and forward the forwarding tables to input components 555 and/or output components 565. Input components 555 and/or output components 565 may use the forwarding tables to perform route lookups for incoming and/or outgoing packets.

Controller 570 may perform one or more processes described herein. Controller 570 may perform these processes in response to executing software instructions stored by a non-transitory computer-readable medium.

Software instructions may be read into a memory and/or storage component associated with controller 570 from another computer-readable medium or from another device via a communication interface. When executed, software instructions stored in a memory and/or storage component associated with controller 570 may cause controller 570 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5B are provided as an example. In practice, device 550 may include additional components, fewer components, different components, or differently arranged components than those shown in FIG. 5B. Additionally, or alternatively, a set of components (e.g., one or more components) of device 550 may perform one or more functions described as being performed by another set of components of device 550.

FIG. 6 is a flow chart of an example process 600 for automatic formation of a virtual chassis using ZTP. In some implementations, one or more process blocks of FIG. 6 may be performed by a network device (e.g., network device 410-1). In some implementations, one or more process blocks of FIG. 6 may be performed by another device or a group of devices separate from or including the network device, such as another network device (e.g., network device 410-2, network device 410-N, and/or the like), a bootstrap device (e.g., bootstrap device 420), and/or the like.

As shown in FIG. 6, process 600 may include obtaining information concerning a virtual chassis, wherein the information concerning the virtual chassis indicates that the network device and an additional network device are to be included in the virtual chassis (block 610). For example, the network device (e.g., using processor 510, memory 515, storage component 520, input component 525, output component 530, communication interface 535, input component 555, switching component 560, output component 565, controller 570, and/or the like) may obtain information concerning a virtual chassis, as described above. In some implementations, the information concerning the virtual chassis indicates that the network device and an additional network device are to be included in the virtual chassis.

As further shown in FIG. 6, process 600 may include determining, based on the information concerning the virtual chassis, that the network device is connected to the additional network device, wherein the network device is connected to the additional network device via a link between a network interface of the network device and a network interface of the additional network device (block 620). For example, the network device (e.g., using processor 510, memory 515, storage component 520, input component 525, output component 530, communication interface 535, input component 555, switching component 560, output component 565, controller 570, and/or the like) may determine, based on the information concerning the virtual chassis, that the network device is connected to the additional network device, as described above. In some implementations, the network device is connected to the additional network device via a link between a network interface of the network device and a network interface of the additional network device.

As further shown in FIG. 6, process 600 may include causing the network interface of the network device to be converted to a virtual chassis interface and the network interface of the additional network device to be converted to a virtual chassis interface to enable the network device and the additional network device to be included in the virtual chassis (block 630). For example, the network device (e.g., using processor 510, memory 515, storage component 520, input component 525, output component 530, communication interface 535, input component 555, switching component 560, output component 565, controller 570, and/or the like) may cause the network interface of the network device to be converted to a virtual chassis interface and the network interface of the additional network device to be converted to a virtual chassis interface to enable the network device and the additional network device to be included in the virtual chassis, as described above.

Process 600 may include additional implementations, such as any single implementation or any combination of implementations described below and/or in connection with one or more other processes described elsewhere herein.

In a first implementation, obtaining the information concerning the virtual chassis comprises sending a bootstrap request message to a server device; receiving, after sending the bootstrap request message to the server device, a bootstrap response message from the server device, and processing the bootstrap response message to determine the information concerning the virtual chassis.

In a second implementation, alone or in combination with the first implementation, the information concerning the virtual chassis includes at least one of information identifying the virtual chassis; information identifying a mode of the virtual chassis; information identifying two or more network devices to be included in the virtual chassis; information identifying at least one network interface of each network device, of the two or more network devices to be included in the virtual chassis, to be converted to a virtual chassis interface; or information identifying respective roles of the two or more network devices to be included in the virtual chassis.

In a third implementation, alone or in combination with one or more of the first and second implementations, determining that the network device is connected to the additional network device comprises sending, via the link, a neighbor discovery request to the additional network device; receiving, via the link and after sending the neighbor discovery request to the additional network device, a neighbor discovery request acknowledgment from the additional network device; and determining, based on the neighbor discovery request acknowledgment and the information concerning the virtual chassis, that the network device is connected to the additional network device via the link.

In a fourth implementation, alone or in combination with one or more of the first through third implementations, causing the network interface of the network device to be converted to a virtual chassis interface comprises sending a conversion command to a chassis manager module of the network device to cause the chassis manager module to convert the network interface of the network device to a virtual chassis interface.

In a fifth implementation, alone or in combination with one or more of the first through fourth implementations, causing the network interface of the additional network device to be converted to a virtual chassis interface comprises sending, via the link, a conversion request to the additional network device; receiving, via the link and after sending the conversion request to the additional network device, a conversion request acknowledgment from the additional network device; and sending, via the link and after receiving the conversion request acknowledgment from the additional network device, a conversion command to the additional network device to cause the additional network device to convert the network interface of the additional network device to a virtual chassis interface.

In a sixth implementation, alone or in combination with one or more of the first through fifth implementations, process 600 includes communicating, via the virtual chassis interface of the network device and a virtual chassis interface of the additional network device, virtual chassis specific control traffic with the additional network device; and determining, based on communicating the virtual chassis specific control traffic with the additional network device, that the virtual chassis includes the network device and the additional network device.

In a seventh implementation, alone or in combination with one or more of the first through sixth implementations, process 600 includes determining that the virtual chassis includes the network device and the additional network device; and sending, after determining that the virtual chassis includes the network device and the additional network device, a report concerning a status of the virtual chassis to a server device.

In an eighth implementation, alone or in combination with one or more of the first through seventh implementations, the report concerning the status of the virtual chassis indicates that the virtual chassis is partially formed or that the virtual chassis is fully formed.

In a ninth implementation, alone or in combination with one or more of the first through eighth implementations, process 600 includes communicating, via the virtual chassis interface of the network device and a virtual chassis interface of the additional network device, with the additional network device; and determining, based on communicating with the additional network device, respective roles for the network device and the additional network device in the virtual chassis.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for automatic formation of a virtual chassis using ZTP. In some implementations, one or more process blocks of FIG. 7 may be performed by a network device (e.g., network device 410-2). In some implementations, one or more process blocks of FIG. 7 may be performed by another device or a group of devices separate from or including the network device, such as another network device (e.g., network device 410-1, network device 410-N, and/or the like), a bootstrap device (e.g., bootstrap device 420), and/or the like.

As shown in FIG. 7, process 700 may include receiving, via a network interface of the network device, a neighbor discovery request from a different network device associated with a virtual chassis (block 710). For example, the network device (e.g., using processor 510, memory 515, storage component 520, input component 525, output component 530, communication interface 535, input component 555, switching component 560, output component 565, controller 570, and/or the like) may receive, via a network interface of the network device, a neighbor discovery request from a different network device associated with a virtual chassis, as described above.

As further shown in FIG. 7, process 700 may include sending, via the network interface of the network device and after receiving the neighbor discovery request, a neighbor discovery request acknowledgment (block 720). For example, the network device (e.g., using processor 510, memory 515, storage component 520, input component 525, output component 530, communication interface 535, input component 555, switching component 560, output component 565, controller 570, and/or the like) may send, via the network interface of the network device and after receiving the neighbor discovery request, a neighbor discovery request acknowledgment, as described above.

As further shown in FIG. 7, process 700 may include receiving, via the network interface of the network device and after sending the neighbor discovery request acknowledgment, a conversion request from the different network device (block 730). For example, the network device (e.g., using processor 510, memory 515, storage component 520, input component 525, output component 530, communication interface 535, input component 555, switching component 560, output component 565, controller 570, and/or the like) may receive, via the network interface of the network device and after sending the neighbor discovery request acknowledgment, a conversion request from the different network device, as described above.

As further shown in FIG. 7, process 700 may include sending, via the network interface of the network device and after receiving the conversion request, a conversion request acknowledgment (block 740). For example, the network device (e.g., using processor 510, memory 515, storage component 520, input component 525, output component 530, communication interface 535, input component 555, switching component 560, output component 565, controller 570, and/or the like) may send, via the network interface of the network device and after receiving the conversion request, a conversion request acknowledgment, as described above.

As further shown in FIG. 7, process 700 may include receiving, via the network interface of the network device and after sending the conversion request acknowledgment, a conversion command from the different network device (block 750). For example, the network device (e.g., using processor 510, memory 515, storage component 520, input component 525, output component 530, communication interface 535, input component 555, switching component 560, output component 565, controller 570, and/or the like) may receive, via the network interface of the network device and after sending the conversion request acknowledgment, a conversion command from the different network device, as described above.

As further shown in FIG. 7, process 700 may include causing, based on the conversion command, the network interface of the network device to be converted to a virtual chassis interface to facilitate the network device being included in the virtual chassis (block 760). For example, the network device (e.g., using processor 510, memory 515, storage component 520, input component 525, output component 530, communication interface 535, input component 555, switching component 560, output component 565, controller 570, and/or the like) may cause, based on the conversion command, the network interface of the network device to be converted to a virtual chassis interface to facilitate the network device being included in the virtual chassis, as described above.

Process 700 may include additional implementations, such as any single implementation or any combination of implementations described below and/or in connection with one or more other processes described elsewhere herein.

In a first implementation, process 700 includes sending a bootstrap request message to a server device; receiving, after sending the bootstrap request message to the server device, a bootstrap response message from the server device; and processing the bootstrap response message to determine information identifying the virtual chassis, wherein the information identifying the virtual chassis enables the network device to send the neighbor discovery request acknowledgment.

In a second implementation, alone or in combination with the first implementation, sending the neighbor discovery request acknowledgment comprises determining that the information identifying the virtual chassis matches information included in the neighbor discovery request; and sending, based on determining that the information identifying the virtual chassis matches the information included in the neighbor discovery request, the neighbor discovery request acknowledgment.

In a third implementation, alone or in combination with one or more of the first and second implementations, the neighbor discovery request includes information identifying the virtual chassis, information identifying the different network device, and information identifying a network interface of the different network device, wherein the neighbor discovery request acknowledgment includes information identifying the network device and information identifying the network interface of the network device.

In a fourth implementation, alone or in combination with one or more of the first through third implementations, causing the network interface of the network device to be converted to the virtual chassis interface to facilitate the network device being included in the virtual chassis comprises causing a virtual chassis manager module of the network device to send the conversion command to a chassis manager module of the network device to cause the chassis manager module to convert the network interface into the virtual chassis interface.

In a fifth implementation, alone or in combination with one or more of the first through fourth implementations, process 700 includes communicating, via the virtual chassis interface, virtual chassis specific control traffic with the different network device.

In a sixth implementation, alone or in combination with one or more of the first through fifth implementations, process 700 includes communicating, via the virtual chassis interface, with the different network device to facilitate the network device being assigned a role in the virtual chassis.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
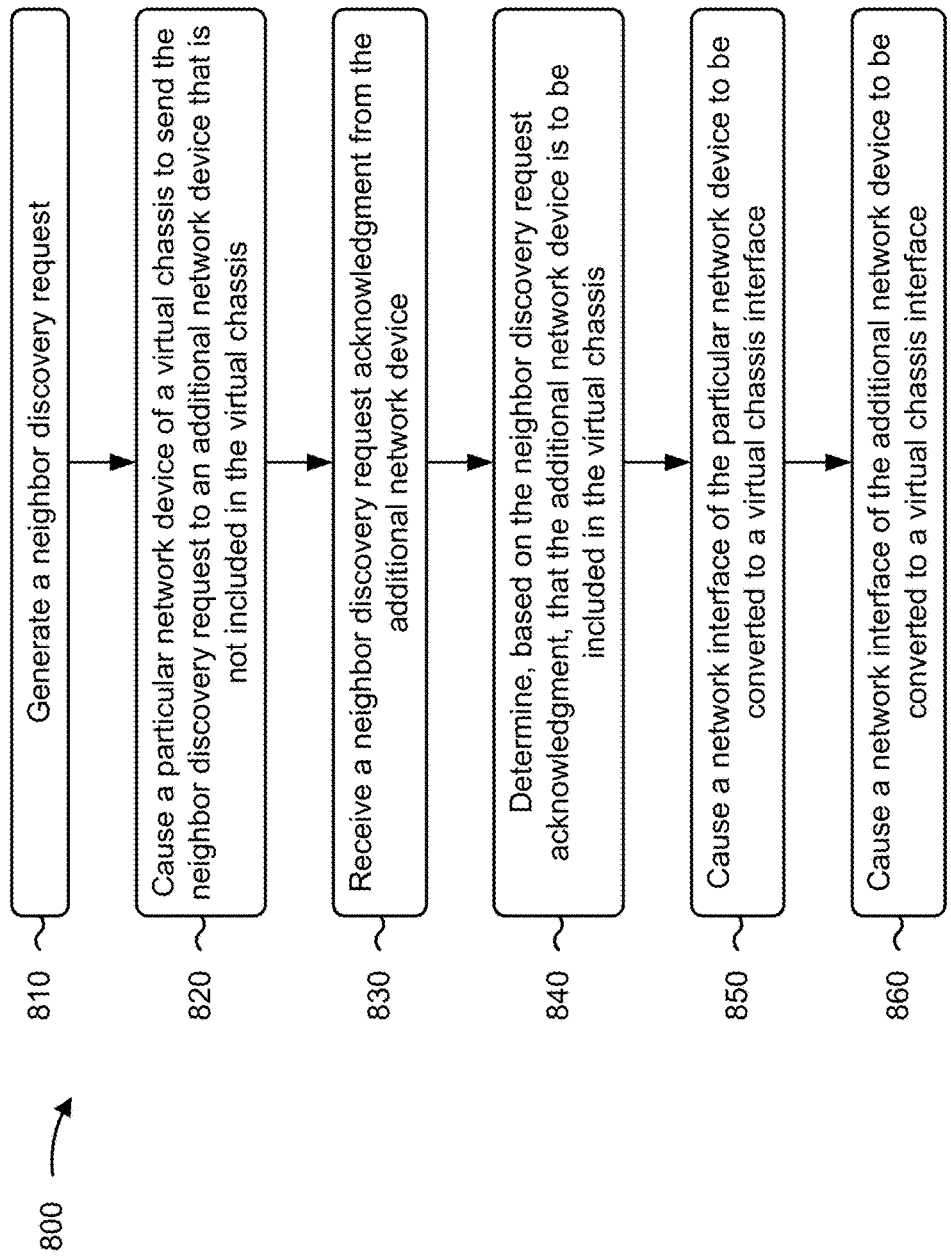

FIG. 8 is a flow chart of an example process 800 for automatic formation of a virtual chassis using ZTP. In some implementations, one or more process blocks of FIG. 8 may be performed by a network device (e.g., network device 410-1). In some implementations, one or more process blocks of FIG. 8 may be performed by another device or a group of devices separate from or including the network device, such as another network device (e.g., network device 410-2, network device 410-N, and/or the like), a bootstrap device (e.g., bootstrap device 420), and/or the like.

As shown in FIG. 8, process 800 may include generating a neighbor discovery request (block 810). For example, the network device (e.g., using processor 510, memory 515, storage component 520, input component 525, output component 530, communication interface 535, input component 555, switching component 560, output component 565, controller 570, and/or the like) may generate a neighbor discovery request, as described above.

As further shown in FIG. 8, process 800 may include causing a particular network device of a virtual chassis to send the neighbor discovery request to an additional network device that is not included in the virtual chassis (block 820). For example, the network device (e.g., using processor 510, memory 515, storage component 520, input component 525, output component 530, communication interface 535, input component 555, switching component 560, output component 565, controller 570, and/or the like) may cause a particular network device of a virtual chassis to send the neighbor discovery request to an additional network device that is not included in the virtual chassis, as described above.

As further shown in FIG. 8, process 800 may include receiving a neighbor discovery request acknowledgment from the additional network device (block 830). For example, the network device (e.g., using processor 510, memory 515, storage component 520, input component 525, output component 530, communication interface 535, input component 555, switching component 560, output component 565, controller 570, and/or the like) may receive a neighbor discovery request acknowledgment from the additional network device, as described above.

As further shown in FIG. 8, process 800 may include determining, based on the neighbor discovery request acknowledgment, that the additional network device is to be included in the virtual chassis (block 840). For example, the network device (e.g., using processor 510, memory 515, storage component 520, input component 525, output component 530, communication interface 535, input component 555, switching component 560, output component 565, controller 570, and/or the like) may determine, based on the neighbor discovery request acknowledgment, that the additional network device is to be included in the virtual chassis, as described above.

As further shown in FIG. 8, process 800 may include causing a network interface of the particular network device to be converted to a virtual chassis interface (block 850). For example, the network device (e.g., using processor 510, memory 515, storage component 520, input component 525, output component 530, communication interface 535, input component 555, switching component 560, output component 565, controller 570, and/or the like) may cause a network interface of the particular network device to be converted to a virtual chassis interface, as described above.

As further shown in FIG. 8, process 800 may include causing a network interface of the additional network device to be converted to a virtual chassis interface (block 860). For example, the network device (e.g., using processor 510, memory 515, storage component 520, input component 525, output component 530, communication interface 535, input component 555, switching component 560, output component 565, controller 570, and/or the like) may cause a network interface of the additional network device to be converted to a virtual chassis interface, as described above.

Process 800 may include additional implementations, such as any single implementation or any combination of implementations described below and/or in connection with one or more other processes described elsewhere herein.

In a first implementation, the particular network device is connected to the additional network device via a link that connects the network interface of the particular network device to the network interface of the additional network device.

In a second implementation, alone or in combination with the first implementation, causing a network interface of the additional network device to be converted to a virtual chassis interface comprises causing the particular network device to send a conversion request to the additional network device; receiving, from the particular network device, a conversion request acknowledgment that was generated by the additional network device; causing, after receiving the conversion request acknowledgment, the particular network device to send a conversion command to the additional network device; and determining, after causing the particular network device to send the conversion command to the additional network device, that the virtual chassis includes the additional network device.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a provisioning manager (PM) module of a network device, a bootstrap response message that includes primary information,
     wherein the primary information includes information identifying a virtual chassis and information indicating an additional network device to be included in the virtual chassis;
   causing the PM module of the network device to send the primary information concerning the virtual chassis to a virtual chassis manager (VCM) module of the network device;
   determining, by the VCM module of the network device and based on the primary information concerning the virtual chassis, that the network device is connected to the additional network device,
     wherein the network device is connected to the additional network device via a link between a network interface of the network device and a network interface of the additional network device; and
   causing the network interface of the network device to be converted to a virtual chassis interface and the network interface of the additional network device to be converted to a virtual chassis interface to enable the network device and the additional network device to be included in the virtual chassis.

2. The method of claim 1, wherein the primary information concerning the virtual chassis includes at least one of:
   information identifying the virtual chassis;
   information identifying a mode of the virtual chassis; or
   information identifying a respective role of the network device and the additional network device to be included in the virtual chassis.

3. The method of claim 1, wherein determining that the network device is connected to the additional network device comprises:
   sending, via the link, a neighbor discovery request to the additional network device;
   receiving, via the link and after sending the neighbor discovery request to the additional network device, a neighbor discovery request acknowledgment from the additional network device; and
   determining, based on the neighbor discovery request acknowledgment and the primary information concerning the virtual chassis, that the network device is connected to the additional network device via the link.

4. The method of claim 1, wherein causing the network interface of the network device to be converted to the virtual chassis interface comprises:
   sending a conversion command to a chassis manager module of the network device to cause the chassis manager module to convert the network interface of the network device to the virtual chassis interface.

5. The method of claim 1, wherein causing the network interface of the additional network device to be converted to the virtual chassis interface comprises:
   sending, via the link, a conversion request to the additional network device;
   receiving, via the link and after sending the conversion request to the additional network device, a conversion request acknowledgment from the additional network device; and
   sending, via the link and after receiving the conversion request acknowledgment from the additional network device, a conversion command to the additional network device to cause the additional network device to convert the network interface of the additional network device to a virtual chassis interface.

6. The method of claim 1, further comprising:
   communicating, via the virtual chassis interface of the network device and a virtual chassis interface of the additional network device, virtual chassis specific control traffic with the additional network device; and
   determining, based on communicating the virtual chassis specific control traffic with the additional network device, that the virtual chassis includes the network device and the additional network device.

7. The method of claim 1, further comprising:
   determining that the virtual chassis includes the network device and the additional network device; and
   sending, after determining that the virtual chassis includes the network device and the additional network device, a report concerning a status of the virtual chassis to a server device.

8. The method of claim 7, wherein the report concerning the status of the virtual chassis indicates that the virtual chassis is partially formed or that the virtual chassis is fully formed.

9. The method of claim 1, further comprising:
   communicating, via the virtual chassis interface of the network device and the virtual chassis interface of the additional network device, with the additional network device; and
   determining, based on communicating with the additional network device, respective roles for the network device and the additional network device in the virtual chassis.

10. A network device, comprising:
    one or more memories; and
    one or more processors to:

receive, by a provisioning manager (PM) module of the network device, a bootstrap response message that includes primary information;
  wherein the primary information includes information identifying a virtual chassis and information indicating a different network device to be included in the virtual chassis;
cause the PM module of the network device to send the primary information concerning the virtual chassis to a virtual chassis manager module of the network device;
receive, via a network interface of the network device, a neighbor discovery request from the different network device;
send, via the network interface of the network device and after receiving the neighbor discovery request, a neighbor discovery request acknowledgment;
receive, via the network interface of the network device and after sending the neighbor discovery request acknowledgment, a conversion request from the different network device;
send, via the network interface of the network device and after receiving the conversion request, a conversion request acknowledgment;
receive, via the network interface of the network device and after sending the conversion request acknowledgment, a conversion command from the different network device; and
cause, based on the conversion command, the network interface of the network device to be converted to a virtual chassis interface to facilitate the network device being included in the virtual chassis.

11. The network device of claim 10, wherein the one or more processors, when sending the neighbor discovery request acknowledgment, are to:
  determine that the information identifying the virtual chassis matches information included in the neighbor discovery request; and
  send, based on determining that the information identifying the virtual chassis matches the information included in the neighbor discovery request, the neighbor discovery request acknowledgment.

12. The network device of claim 10, wherein the neighbor discovery request includes information identifying the virtual chassis, information identifying the different network device, and information identifying a network interface of the different network device,
  wherein the neighbor discovery request acknowledgment includes information identifying the network device and information identifying the network interface of the network device.

13. The network device of claim 10, wherein the one or more processors, when causing the network interface of the network device to be converted to the virtual chassis interface to facilitate the network device being included in the virtual chassis, are to:
  cause the virtual chassis manager module of the network device to send the conversion command to a chassis manager module of the network device to cause the chassis manager module to convert the network interface into the virtual chassis interface.

14. The network device of claim 10, wherein the one or more processors are further to:
  communicate, via the virtual chassis interface, virtual chassis specific control traffic with the different network device.

15. The network device of claim 10, wherein the one or more processors are further to:
  communicate, via the virtual chassis interface, with the different network device to facilitate the network device being assigned a role in the virtual chassis.

16. The network device of claim 10 wherein the primary information concerning the virtual chassis includes at least one of:
  information identifying a mode of the virtual chassis; or
  information identifying a respective role of the network device and the different network device to be included in the virtual chassis.

17. A non-transitory computer-readable medium storing instructions, the instructions comprising:
  one or more instructions that, when executed by one or more processors of a master routing network device of a virtual chassis, cause the one or more processors to:
    receive, by a provisioning manager (PM) module of the master routing network device, a bootstrap response message that includes primary information,
      wherein the primary information includes information identifying the virtual chassis and information indicating an additional network device to be included in the virtual chassis;
    cause the PM module of the master routing network device to send the primary information concerning the virtual chassis to a virtual chassis manager module of the master routing network device;
    generate a neighbor discovery request;
    cause a particular network device of the virtual chassis to send the neighbor discovery request to the additional network device that is not included in the virtual chassis;
    receive a neighbor discovery request acknowledgment from the additional network device;
    determine, based on the neighbor discovery request acknowledgment, that the additional network device is to be included in the virtual chassis;
    cause a network interface of the particular network device to be converted to a virtual chassis interface; and
    cause a network interface of the additional network device to be converted to a virtual chassis interface.

18. The non-transitory computer-readable medium of claim 17, wherein the particular network device is connected to the additional network device via a link that connects the network interface of the particular network device to the network interface of the additional network device.

19. The non-transitory computer-readable medium of claim 17, wherein the one or more instructions, that cause the one or more processors to cause the network interface of the additional network device to be converted to the virtual chassis interface, cause the one or more processors to:
  cause the particular network device to send a conversion request to the additional network device;
  receive, from the particular network device, a conversion request acknowledgment that was generated by the additional network device;
  cause, after receiving the conversion request acknowledgment, the particular network device to send a conversion command to the additional network device; and
  determine, after causing the particular network device to send the conversion command to the additional network device, that the virtual chassis includes the additional network device.

* * * * *